US011016898B2

(12) United States Patent
Turner et al.

(10) Patent No.: US 11,016,898 B2
(45) Date of Patent: May 25, 2021

(54) SYSTEM AND METHOD FOR MIXED TILE-AWARE AND TILE-UNAWARE TRAFFIC THROUGH A TILE-BASED ADDRESS APERTURE

(71) Applicant: QUALCOMM INCORPORATED, San Diego, CA (US)

(72) Inventors: Andrew Edmund Turner, San Diego, CA (US); George Patsilaras, San Diego, CA (US); Bohuslav Rychlik, San Diego, CA (US); Wesley James Holland, Encinitas, CA (US); Jeffrey Shabel, San Diego, CA (US); Simon Peter William Booth, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 31 days.

(21) Appl. No.: 16/543,328

(22) Filed: Aug. 16, 2019

(65) Prior Publication Data
US 2021/0049099 A1    Feb. 18, 2021

(51) Int. Cl.
| | | |
|---|---|---|
| *G06F 12/0868* | (2016.01) | |
| *G06F 12/02* | (2006.01) | |
| *G06F 12/0846* | (2016.01) | |
| *G06F 12/121* | (2016.01) | |
| *G06F 12/0891* | (2016.01) | |

(Continued)

(52) U.S. Cl.
CPC ...... *G06F 12/0848* (2013.01); *G06F 12/0246* (2013.01); *G06F 12/0868* (2013.01); *G06F 12/0871* (2013.01); *G06F 12/0891* (2013.01); *G06F 12/1072* (2013.01); *G06F 12/121* (2013.01)

(58) Field of Classification Search
CPC ............. G06F 12/0848; G06F 12/1072; G06F 12/0868; G06F 12/0246; G06F 12/121; G06F 12/0891; G06F 12/0871
See application file for complete search history.

(56) References Cited

U.S. PATENT DOCUMENTS

| | | | | |
|---|---|---|---|---|
| 6,674,443 | B1 * | 1/2004 | Chowdhuri | ......... G06F 12/0875 |
| | | | | 345/531 |
| 8,120,990 | B2 * | 2/2012 | Kim | ...................... G11C 16/08 |
| | | | | 365/238.5 |

(Continued)

*Primary Examiner* — Sean D Rossiter
(74) *Attorney, Agent, or Firm* — Smith Tempel Blaha LLC/Qualcomm

(57) ABSTRACT

In one aspect, space in a tile-unaware cache associated with an address aperture may be managed in different ways depending on whether a processing component initiating an access request through the aperture to a tile-based memory is tile-unaware or tile-aware. Upon a full-tile read by a tile-aware process, data may be evicted from the cache, or space may not be allocated. Upon a full-tile write by a tile-aware process, data may be evicted from the cache. In another aspect, a tile-unaware process may be supplemented with tile-aware features by generating a full tile of addresses in response to a partial-tile access. Upon a partial-tile read by the tile-unaware process, the generated addresses may be used to pre-fetch data. Upon a partial-tile write, the addresses may be used to evict data. Upon a bit block transfer, the addresses may be used in dividing the bit block transfer into units of tiles.

15 Claims, 18 Drawing Sheets

(51) Int. Cl.
 *G06F 12/0871* (2016.01)
 *G06F 12/1072* (2016.01)

(56) References Cited

U.S. PATENT DOCUMENTS

| | | | |
|---|---|---|---|
| 8,139,073 B1 * | 3/2012 | Van Dyke | G06F 13/1626 |
| | | | 345/535 |
| 9,285,997 B2 * | 3/2016 | Tanzawa | G06F 3/0688 |
| 10,747,671 B1 * | 8/2020 | Holland | G06F 12/1009 |
| 2020/0250097 A1 * | 8/2020 | Holland | G06F 12/0862 |
| 2020/0250101 A1 * | 8/2020 | Patsilaras | H03M 7/30 |

* cited by examiner

SYSTEM AND METHOD FOR MIXED TILE-AWARE AND TILE-UNAWARE TRAFFIC THROUGH A TILE-BASED ADDRESS APERTURE

RELATED APPLICATIONS STATEMENT

This application is related to the following two U.S. Applications: U.S. patent application Ser. No. 16/269,399, filed Feb. 6, 2019, entitled "SYSTEM ANT) METHOD FOR INTELLIGENT TILE-BASED MEMORY BANDWIDTH MANAGEMENT," and U.S. patent application Ser. No. 16/269,440, filed Feb. 6, 2019, entitled "SYSTEM AND METHOD FOR INTELLIGENT TILE-BASED PREFETCHING OF IMAGE FRAMES IN A SYSTEM ON A CHIP."

DESCRIPTION OF THE RELATED ART

Portable computing devices ("PCDs") are becoming necessities for people on personal and professional levels. These devices may include cellular telephones, portable digital assistants ("PDAs"), portable game consoles, palmtop computers, and other portable electronic devices. PCDs commonly contain integrated circuits, which may include one or more systems-on-a-chip ("SoCs"). An SoC includes numerous sub-system components configured to work together to deliver functionality to a user. For example, an SoC may contain any number of processing engines, such as modems, central processing units ("CPUs"), graphical processing units ("GPUs"), etc., that read and write data and instructions to and from memory components on the SoC.

The efficient sizing of bus bandwidth and memory components in a PCD is important for optimizing the functional capabilities of processing components on the SoC and guaranteeing a minimum required quality of service ("QoS") level. Commonly, the utilization of memory capacity and bus bandwidth is further optimized by compressing data so that the data requires less bus bandwidth to transmit and less space in the memory for storage.

A memory component may be configured to operate in accordance with an address space that is organized in units known as tiles, each having a width of multiple words and a height of multiple data lines, and in which the data is stored in a compressed format. Organizing a frame of image data in sub-units of tiles allows the compression algorithm to exploit spatial locality in the data. Nevertheless, a process (executing on a processor) that accesses data stored in a tile-based memory component may be configured to operate in accordance with a different, linear address space, i.e., reading, writing and caching data without regard to the memory component's tile-based address space. A component that may be referred to as an address aperture may operate as an intermediary between such a process and memory component, servicing the process' linearly addressed transactions from the memory component's non-linear, tile-based address space. A "functional" address aperture is a type of address aperture that additionally performs a function upon the data that passes through the aperture, such as the above-referenced compression and decompression. A process that is configured to directly operate only in accordance with its linear address space, oblivious to the memory component's tile-based address space, may be referred to as a tile-unaware process.

Nevertheless, an SoC may include, in addition to one or more tile-unaware processes, one or more tile-aware processes that may be configured to operate in accordance with the memory component's tile-based address space. Therefore, there is a need in the art for improved systems and methods for efficiently managing not only linearly addressed transactions but also a mixture of linearly addressed transactions and tile-based transactions through a tile-based address aperture.

SUMMARY OF THE DISCLOSURE

Various embodiments of methods and systems for tile-based memory bandwidth management in a portable computing device ("PCD") are disclosed. The methods and systems may be configured to handle linearly addressed transactions, tile-based transactions, or a mixture of both, through a tile-based address aperture.

An exemplary method for tile-based memory bandwidth management in a PCD may be directed to managing free space in a tile-based cache of the address aperture based on whether a processing component initiating an access request is tile-unaware or tile aware. The method may include receiving at the address aperture a data read request from a processing component for data stored in a memory component having a tile-based address structure. The data read request is associated with a linear aperture address. The method may further include, in response to receiving the data read request, determining a tile-based address in an alias address region of the memory component. The tile-based address is associated with one or more tiles containing data needed for servicing the data read request. The method may also include determining whether the one or more tiles are available in a tile-based cache of the address aperture. If it is determined that the one or more tiles are not available in the tile-based cache of the address aperture, the address aperture may read the one or more tiles from the memory component. The address aperture may then return to the processing component data from the one or more tiles read from the memory component. The method may still further include determining whether the processing component is tile-unaware or tile-aware, and managing free space in the tile-based cache (e.g., managing eviction policies, allocation policies, etc.) based on whether the processing component is tile-unaware or tile-aware.

An exemplary system for tile-based memory bandwidth management in a PCD may be directed to an address aperture that manages free space in a tile-based cache of the address aperture based on whether a processing component initiating an access request is tile-unaware or tile-aware. The system includes the address aperture and, in various exemplary embodiments, may further include other components, such as a memory component having a tile-based address structure. The address aperture may be configured to receive a data read request from a processing component for data stored in the memory component. The data read request is associated with a linear aperture address. The address aperture may further be configured, in response to receiving the data read request, to determine a tile-based address in an alias address region of the memory component. The tile-based address is associated with one or more tiles containing data needed for servicing the data read request. The address aperture may also be configured to determine whether the one or more tiles are available in a tile-based cache of the address aperture. If it is determined that the one or more tiles are not available in the tile-based cache of the address aperture, the address aperture may read the one or more tiles from the memory component. The address aperture may then return to the processing component data from the one or more tiles read from the memory component. The address aperture may still further be configured to determine whether the processing component is tile-unaware or tile-aware, and manage free space in the tile-based cache (e.g., manage eviction policies, allocation policies, etc.) based on whether the processing component is tile-unaware or tile-aware.

Another exemplary method for intelligent tile-based memory bandwidth management in a PCD may be directed to generating a plurality of linear aperture addresses representing a plurality of tile-based addresses in an alias address region of a memory component, to facilitate, for example, pre-fetching data into a cache, evicting data from a cache, dividing a bit block transfer into units of tiles, etc. The method may include a tile-aware processing component detecting a data access request from a tile-unaware processing component. The data access request may be directed to an address aperture in communication with a memory component having a tile-based address structure. The data access request is associated with at least one linear aperture address. The method may further include the tile-aware processing component, in response to detecting the data access request, generating the above-referenced plurality of linear aperture addresses representing a plurality of tile-based addresses in the alias address region of the memory component. The plurality of linear aperture addresses collectively correspond to an entire tile.

Another exemplary system for intelligent tile-based memory bandwidth management in a PCD may include a tile-unaware processing component and a tile-aware processing component. For example, the tile-aware processing component may comprise hardware associated with a processor on which a software-defined tile-unaware processing component is executing. The tile-unaware processing component may be configured to provide a data access request directed to an address aperture that is in communication with a memory component having a tile-based address structure. The data access request is associated with at least one linear aperture address. The tile-aware processing component may be configured to detect the data access request and, in response to detecting the data access request, generate a plurality of linear aperture addresses representing a plurality of tile-based addresses in an alias address region of the memory component to facilitate, for example, pre-fetching data into a cache, evicting data from a cache, dividing a hit block transfer into units of tiles, etc. The plurality of linear aperture addresses collectively correspond to an entire tile.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral encompass all parts having the same reference numeral in all figures.

DETAILED DESCRIPTION

Figure 1:
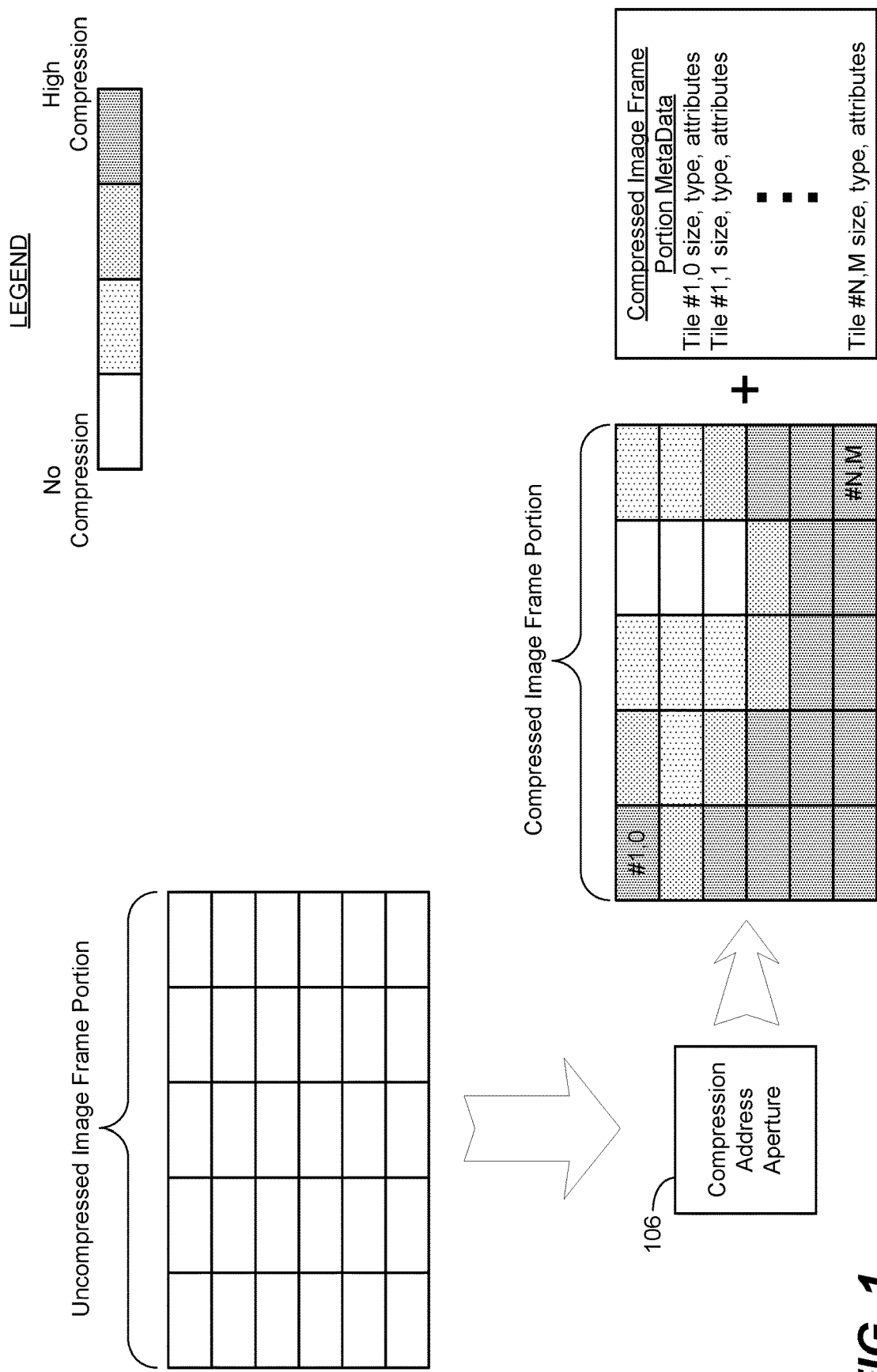
FIG. 1 illustrates the effects of compressing an image frame composed of multiple data sub-units or tiles.

The word "exemplary" is used in this disclosure or description to mean serving as an example, instance, or illustration. Any aspect described herein as "exemplary" is not necessarily to be construed as exclusive, preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the terms "aperture," "component," "database," "module," "block," "system," and the like are intended to refer generally to a computer-related entity. For example, a component may be, but is not limited to being, a portion, slice, etc., of a processor configured by, or operating under the control of, software or firmware executing on the processor, i.e., a process. A component may be localized on one processor or computer and/or distributed between two or more processors or computers. In addition, the software or firmware underlying a component may execute from various computer-readable media having various data structures stored thereon.

In this description, the term "memory component" refers to a component in which data may be stored or may reside. An example of a memory components is random access memory ("RAM"), such as dynamic random access memory ("DRAM"). Double data rate DRAM ("DDR-DRAM" or, for brevity, "DDR") is a type of DRAM commonly configured as main memory or working memory in computers and other computer-related entities. Nevertheless, a reference in this description to "DRAM" or "DDR" memory components is to be understood to envision any of a broader class of RAM and not limit the scope of the description herein to a specific type or generation of RAM. Further, it is envisioned that DDR, DDR-2, DDR-3, low power DDR ("LPDDR") or any subsequent generation of DRAM may be applicable to various embodiments of systems and methods in accordance with this description.

In this description, the terms "central processing unit ("CPU")," "digital signal processor ("DSP")," "graphical processing unit ("GPU")," and "chip" are used interchangeably under otherwise indicated, Moreover, a CPU, DSP, GPU or chip may comprise one or more distinct processing components generally referred to herein as "core(s)."

In this description, the terms "engine," "processing engine," "processing component," "processor," "producer" and the like are used to refer to any component within a system on a chip ("SoC") that generates data and/or image frames and transfers them over a bus to, or from, a memory component via a compression address aperture and/or in cooperation with any other functional aperture. As such, an engine may refer to, but is not limited to refer to, a CPU, DSP, GPU, modem, controller, camera, video recorder, etc.

In this description, the term "bus" refers to a collection of signal conductors through which data is transmitted from a processing engine to a memory component or other device located on or off the SoC. A bus commonly has two parts: an address bus and a data bus, where the data bus transfers data, and the address bus transfers information specifying a location of the data in a memory component (i.e., address and associated metadata). The terms "width" or "bus width" or "bandwidth" refers to an amount of data, i.e. a "chunk size," that may be transmitted per cycle through a given bus. For example, a 16-byte bus may transmit 16 bytes of data at a time, whereas 32-byte bus may transmit 32 bytes of data per cycle. Moreover, "bus speed" refers to the number of times a chunk of data may be transmitted through a given bus each second and, as such, would be understood by one of ordinary skill in the art to relate to "bus capacity." Similarly, a "bus cycle" or "cycle" refers to transmission of one chunk of data through a given bus.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G"), fourth generation ("4G") and fifth generation ("5G") wireless technology have enabled numerous PCDs with multiple capabilities. Therefore, a PCD may be a laptop computer having wireless data connectivity, a smartphone, a cellular telephone, a satellite telephone, a pager, a PDA, a navigation device, a smartbook or reader, a media player, a wearable device, or a combination of the aforementioned devices, among others.

In this description, the terms "image," "image frame," "frame," "buffer," "file," "data set" and the like are used interchangeably.

In this description, the terms "tile" and "unit" are used interchangeably to refer to a block of pixels that forms a subset of a larger block of data, such as an image frame. A "tile" or "unit," depending upon embodiment, may exhibit any aspect ratio (i.e., width and height) suitable for the embodiment and, as such, one of ordinary skill in the art will appreciate that a "tile" or "unit" within an image frame is not necessarily limited to having a "square" aspect ratio, i.e., not necessarily limited to a rectangle having equal length sides.

In this description, the term "uncompressed" refers to a frame in its original, pre-compression state whereas the term "decompressed" refers to a frame that was first compressed from its uncompressed state via a compression address aperture and then later decompressed by the aperture in service to a read request from a processor. Depending on the class of compression used, the data set of a decompressed frame may be identical to the data set of the frame's original, uncompressed state (i.e., lossless compression) or it may not (i.e., lossy compression), as would be understood by one of ordinary skill in the art. Organizing or configuring a memory component to operate in a tile-based address space, in which the stored tiles comprise blocks of pixels, aids a compressor in readily exploiting spatial locality in the compression scheme.

As well understood by one of ordinary skill in the art, an address aperture component provides access to a memory region through an alternate address range. Typically, an address aperture leverages a simple mapping between the addresses it uses ("aperture addresses") and the original addresses ("alias addresses") for the same physical memory locations. A functional address aperture is an address aperture that additionally performs some function on the data as the data passes through the aperture between the processor and the memory component. Examples of functions that may be provided by a functional address aperture include, but are not limited to, encryption, compression and error correction.

Functional address apertures, by virtue of compressing and/or manipulating the data, may introduce a relatively complex mapping between data in the aperture domain versus data in the alias domain. That is, address mapping between the domains may not be 1:1 rather, an address region in the aperture space may correspond to a smaller or larger region in the aliased address space (as might be expected, for example, in the case of a functional address aperture implementing compression). As one of ordinary skill in the art would appreciate, a single data access in the aperture space may correspond to zero, one, or multiple accesses in the aliased space (perhaps even to non-contiguous memory ranges). Moreover, the functional address aperture may leverage a cache such that accesses in the aperture space are delayed or coalesced, as the need may be.

In this description, the term "tile-aware" refers to a component configured to operate in a tile-based address space of another component, such as a memory component, and thus can manipulate data in units of tiles and reference specific tiles with respect to other tiles. In contrast, the term "tile-unaware" refers to a component that is not configured to operate in the tile-based address space of another component, and thus does not manipulate data in units of those tiles or reference specific ones of those tiles with respect to others.

A functional address aperture may be configured and leveraged to implement a tile-aware compression function such that data written by a producing processor to a memory component through the functional (i.e., compression) address aperture may be compressed in view of the tile-based organization of the memory component (e.g., DDR). A benefit of such a functional address aperture is that memory bandwidth compression and tile management in the memory component may be accomplished without the producing processor being sensitive to the compression function and tile size. That is, the producing processor may be tile-unaware. The tile-unaware processor may be configured to operate in a linear address space. The functional address aperture may be configured to map a linear-addressed aperture address region to a tile-addressed alias address region for one or more buffers, accommodate partial-tile read requests, and cache any remaining tile data for later reads (thereby mitigating over-fetch of tiles from the memory). Similarly, such a functional address aperture may be configured to cache write data and/or collect and assemble partial tile writes into complete tiles for efficient compression.

Providing a tile-aware cache in a compression address aperture may mitigate over-fetch and, in so doing, mitigate unnecessary consumption of memory bandwidth. A compression address aperture, in response to a read request issued by a processor, may 1) fetch a programmable lookup data structure from memory in order to determine the associated buffer/tile mapping for the request, 2) check its tile-aware cache to make sure that the identified frame/tiles are not in the cache already, 3) fetch the identified frame/tiles from compressed memory (if not already in its cache), and 4) decompress the compressed frame/tiles. Advantageously, once the tiles are fetched, any subsequent reads to the data stored in those tiles will be serviced by the aperture with relatively low latency, as the tiles would already be in its tile-aware cache (thereby avoiding step 3 and possibly step 4 as described above).

FIG. 1 illustrates the effects of compressing an image frame composed of multiple data sub-units or tiles. In this description, the various embodiments may be described within the context of an image frame, or portion of an image frame, made up of 256-byte tiles. Notably, however, it will be understood that the 256-byte tile sizes, as well as the various compressed data transaction sizes, are exemplary in nature and do not suggest that embodiments are limited in application to 256-byte tile sizes, Moreover, it will be understood that reference to any specific minimum access length ("MAL") or access block size ("ABS") for a DRAM in this description is being used for the convenience of describing embodiments and does not suggest that embodiments are limited in application to a DRAM device having a particular MAL, requirement. As such, one of ordinary skill in the art will recognize that the particular data transfer sizes, chunk sizes, bus widths, MALs, etc. that may be referred to in this description are offered for exemplary purposes only and do not limit the scope of embodiments as being applicable to applications having the same data transfer sizes, chunk sizes, bus widths, MALs, etc.

In FIG. 1, a portion of an uncompressed image frame (aka, a "buffer") is depicted as comprising 30 uncompressed tiles or units, each of a size "X" as represented by an absence of shading. An exemplary size X may be 256 bytes, however, as explained above, a tile is not limited to any certain size and may vary according to application. For ease of illustration and description, the 30-tile portion of the larger uncompressed image frame is depicted as representative of the entire image frame. As would be understood by one of ordinary skill in the art, the uncompressed image frame may be reduced in size, thereby optimizing its transfer over a bus, reducing overall system power consumption and minimizing its impact on memory capacity, by a compression block (e.g., a CODEC) in a compression address aperture 106 that applies a compression algorithm on a tile by tile basis. The result of the compression is a compressed image frame plus a metadata file, as can be seen in FIG. 1 relative to the illustrated portion of the frame. The compressed image frame comprises the tiles in the original, uncompressed image frame after having been subjected to a compression algorithm by the compression block.

In the uncompressed image frame, each tile may be of a size X, whereas in the compressed image frame each tile may be of a size X or less (X for no compression possible, X-1 bytes, X-2 bytes, X-3 bytes, . . . , X=1 byte). In FIG. 1, the various tiles that form the compressed image frame are represented by differing levels of shading depending on the extent of compression that resulted from the compression block having applied its compression algorithm to the data held by the given tile. Notably, the compression block creates a companion buffer for a compressed image frame metadata, as would be understood by one of ordinary skill in the art. The compressed image frame metadata contains a record of the size, type and attributes for each compressed tile in the compressed image frame. Because DRAM access may be limited to units of the MAL, the size of a given compressed tile may be represented in the metadata as the number of ABSs required to represent the compressed tile size (e.g., 1 MAL, 2 MAL, . . . n MAL). This size description in the metadata allows a future reader of the buffer to ask the memory for only the minimum required amount of data needed to decompress each tile back to the original size X.

Figure 2:
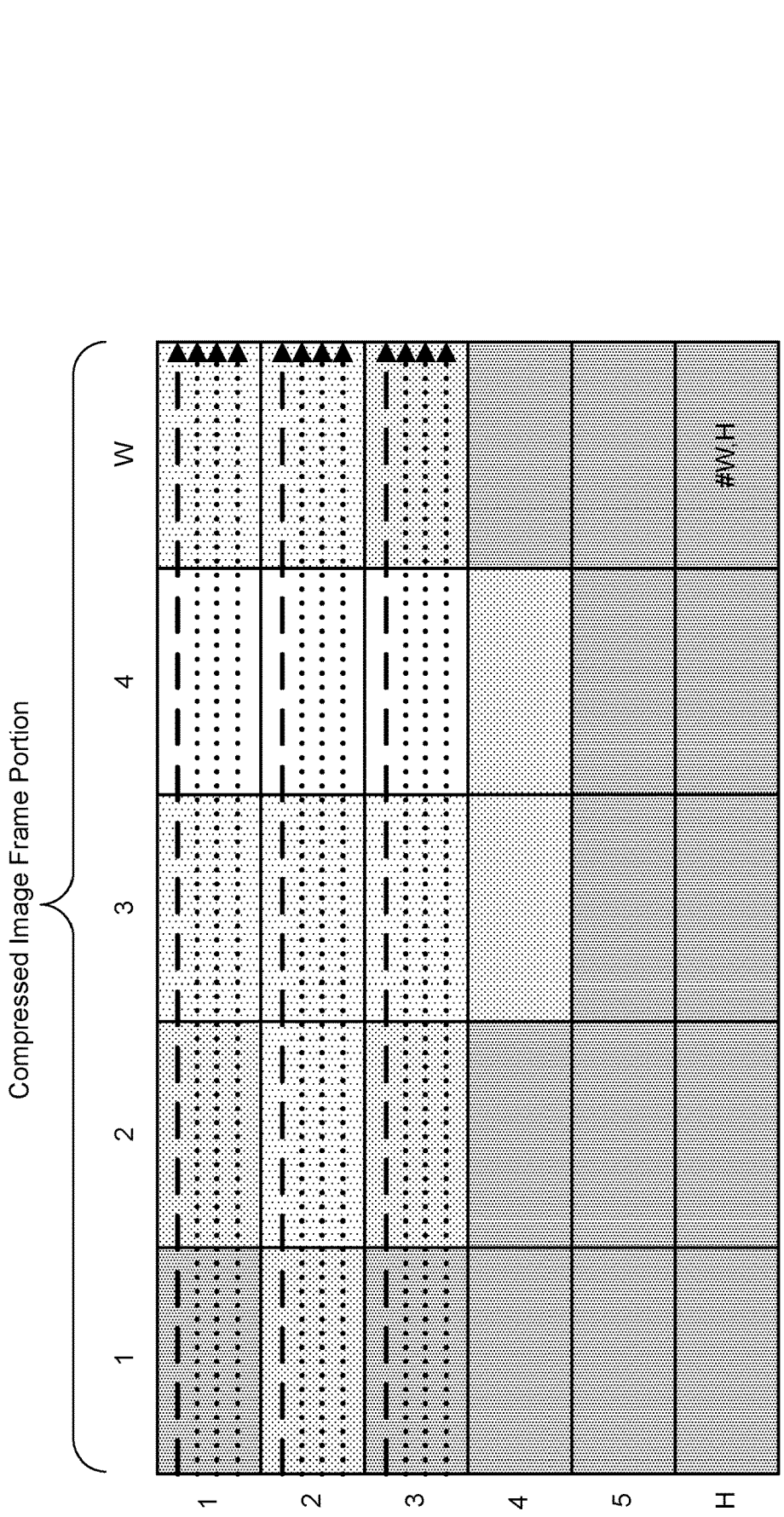
FIG. 2 illustrates a portion of a compressed image frame comprised of tiles and the relative latencies associated with reading data lines that each traverse a series of the tiles.

FIG. 2 illustrates a portion of a compressed image frame comprising tiles, and the relative latencies associated with reading data lines that each traverse a series of the tiles. The exemplary compressed image frame portion is organized into a grid of compressed tiles having W columns and H rows. As a way of illustration, assuming a 4×4 pixel size for each tile, a processor executing a naive raster-order access across the frame will generate a high memory latency for one whole line (e.g., as indicated by the arrow in broken line traversing the columns from tile #1,#1 to tile #W,#1), followed by lower memory latency for reads of the three subsequent lines from the same series of tiles (e.g., as indicated by the arrows in dotted line traversing the columns from tile #1,#1 to tile #W,#1). The reason for the lower memory latency for the subsequent line reads in the illustrated example is because, advantageously, the tiles have been cached after previously retrieving the tiles from memory in order to accommodate the first line read. The pattern repeats with linear reads of data tiles #1,#2 to tile #W,#2, tiles #1,#3 to tile #W,#3, etc. Advantageously, and as will be better understood from the following description and figures, latency for subsequent line reads may be reduced by storing tiles in a tile-aware cache after servicing an initial partial-tile read. Also, and as will be better understood from the following description and figures, partial-tile write data may be aggregated and assembled in a tile-aware cache, and the resulting data may then only be compressed and written to long term memory once a full or entire tile has been assembled. In these ways, memory bandwidth and compression may be optimized by avoiding or mitigating 1) multiple fetches of a given tile to accommodate multiple partial-tile reads and 2) compression and writing of transactions representing less than full-tile data blocks.

As will become evident from the following figures and related description, compressed image frames sub-divided into tiles may be intelligently managed in response to linearly addressed access requests from a processing component, such that tiles are present in a tile-aware cache of a compressed address aperture when needed to service later access requests from the processing component. Linearly addressed write requests from a processing component may be held in a tile-aware cache of a compression address aperture in order to assemble the write transactions into full-tile writes. Such tile-based memory bandwidth management methods may promote efficient memory bandwidth utilization and provide other benefits in examples in which the processing component is tile-unaware.

As will also become evident from the following figures and related description, in some examples, a processing component may be aware of the memory component's tile-based organization and, to the extent feasible, produce and consume data with respect to the memory component at tile granularity, advantageously avoiding partial-tile accesses. Some tile-based memory bandwidth management methods that are beneficial in examples in which the processing component accessing the memory component through the tile-aware address aperture is tile-unaware may be ineffective, or even deleterious, in examples in which a processing component accessing the memory component through the tile-aware address aperture is tile-aware. Deleterious effects may include cache thrashing and increased power consumption, as well as inefficient memory bandwidth utilization. It is contemplated that a tile-aware address aperture may receive some requests to access a tile-based memory component from a tile-unaware processing component and may receive other requests to access the tile-based memory component from a tile-aware processing component. Therefore, it may be beneficial for the address aperture to distinguish between requests from tile-unaware and tile-aware processing components and manage its tile-based cache accordingly.

Figure 3:
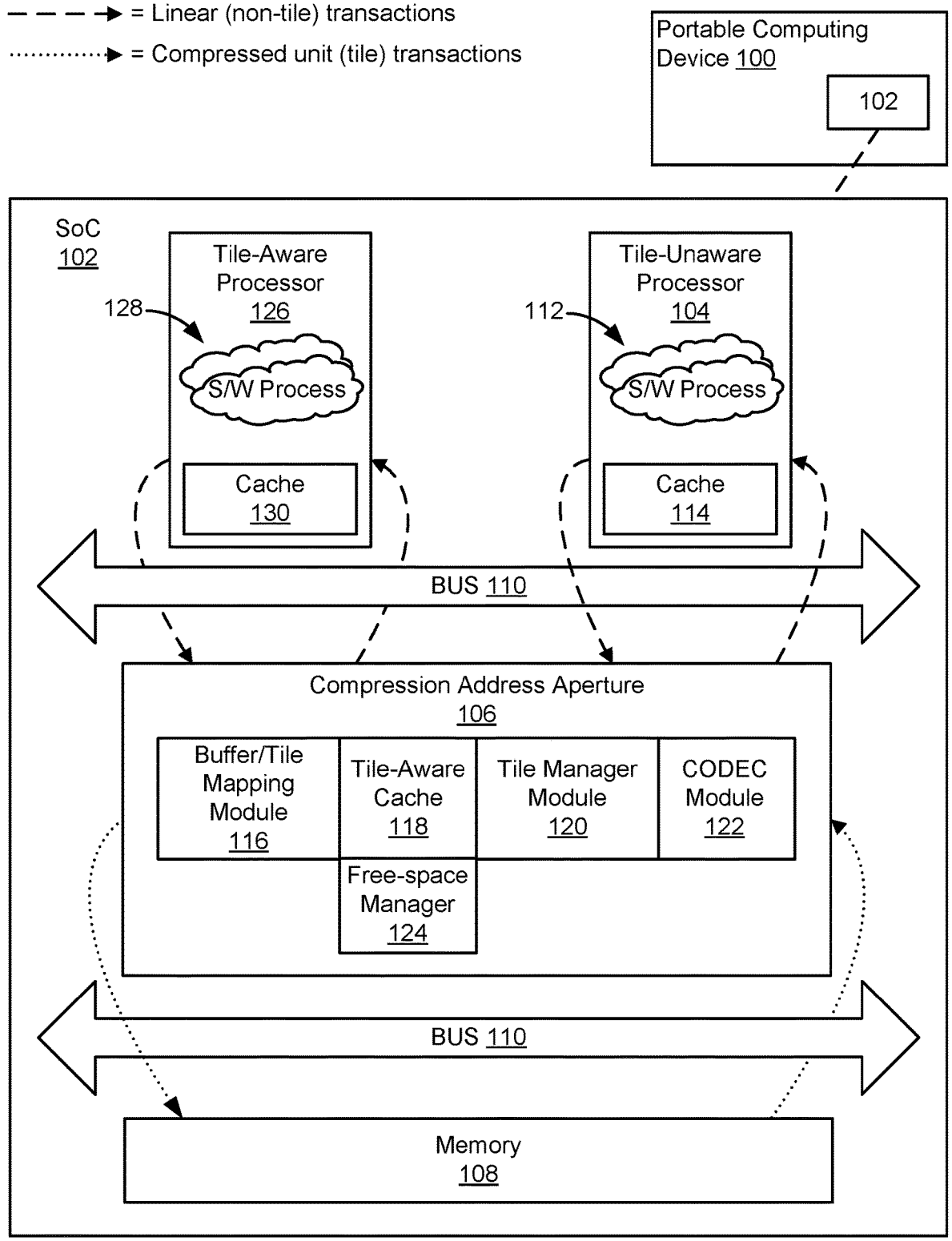
FIG. 3 is a functional block diagram illustrating an on-chip system configured for intelligent tile-based memory bandwidth management, in accordance with exemplary embodiments.

FIG. 3 illustrates an exemplary embodiment of a system-on-a-chip ("SoC") 102 of a portable computing device ("PCD") 100. The SoC 102 is configured for intelligent tile-based memory bandwidth management in a manner described below. A processor 104 and an address aperture 106 communicate with each other and a memory component 108 over a bus 110. The address aperture 106 may also be referred to as a compression address aperture because it may be configured to perform a compression (and inversely, a decompression) function on data passing through it.

One or more processes 112 may be executing on the processor 104. Although a process 112 may also be referred to as a software process, one of ordinary skill in the art understands that the process 112 is embodied in the processor (hardware) 104 as configured by software in execution. In the illustrated embodiment, the processor 104 is associated with a tile-unaware cache 114 and, as such, the processor 104 (under control of the process 112) may make memory access requests to the memory component 108 using a linear (non-tile) address provided to the compression address aperture 106. Accordingly, in the illustrated embodiment both the processor 104 itself and the process 112 executing on the processor 104 may be referred to as tile-unaware. Nevertheless, it is contemplated that in other embodiments (not shown) a tile-aware process and a tile-unaware process may execute concurrently on the same processor and utilize, in effect, tile-aware and tile-unaware portions, respectively, of a shared cache. Accordingly, references in this description to a tile-unaware processing component should be construed as encompassing not only a tile-unaware processor but also a portion of a processor operating under control of a tile-unaware process. Although not separately shown for purposes of clarity, the cache 114 may include conventional eviction logic (i.e., hardware or software or a combination thereof) and evict data in a conventional manner, based on conventional, well-known eviction policies such as least-recently-accessed data.

The address aperture 106 may utilize a buffer/tile: mapping module 116 in order to access a lookup table (not shown in FIG. 3 but may reside in the memory component 108 or some other memory component residing on or off the SoC 102). Using such a lookup table, the buffer/tile mapping module 116 of the address aperture 106 may determine the aperture address that maps to the linear address provided by the processor 104. With the aperture address determined, the address aperture 106 may access the memory component 108.

Notably, the compressed data may be stored in the memory component 108 across a series of tiles and, as such, to return the linearly addressed data requested by the processor 104, the address aperture 106 may be required to make partial reads of multiple tiles in the memory component 108. As explained above, when partial reads of multiple tiles are required in order to service a linear read request, the first line of data may experience a relatively high latency, as multiple tiles must be retrieved or fetched from the memory component 108 into a tile-based or tile-aware cache 118 and decompressed by a CODEC module 122 before the line of data may be returned to the processor 104. To reduce the latency associated with acquiring subsequent lines of data that traverse across multiple tiles of the memory component 108, the address aperture 106 may store the fetched tiles in the cache 118 so that re-fetching of the tiles is unnecessary in order to service subsequent read requests. The address aperture 106 may also include a free-space manager 124 (described in further detail below with regard to an exemplary method) that is associated with the tile-aware cache 118.

A tile manager module 120 may begin fetching compressed tiles that contain the linear data requested by the processor 104. The fetched tiles may be decompressed by the CODEC module 122 and stored in the tile-aware cache 118 in their decompressed state or, alternatively, may be stored in tile-aware cache 118 in their compressed state and later decompressed by the CODEC module 122. Regardless, once decompressed, the partial reads of the tiles may be aggregated and returned to the processor 104 in response to the linearly addressed data read request made by the processor 104. In this way, even though the processor 104 is unaware of the tile-based organization of the compressed image in memory component 108, the compression address aperture 106 may service a linearly addressed data read request from the processor 104.

As the processor 104 continues to make linearly addressed data read requests, and the compression address aperture 106 continues to respond to the requests as described above, the tile manager module 120 may query the tile-aware cache 118 to determine if the needed tiles are in the cache, thereby alleviating any over-fetch. In this way, the tile manager module 120 may anticipate the need for certain compressed tiles to service future linear data requests from the processor 104 and, in so doing, mitigate or lower the average latency to service the data requests while reducing unnecessary burden on memory and bus bandwidth that could result from unnecessary fetches.

The tile manager module 120 may also accommodate linearly addressed data write requests from the tile-unaware processor 104 by storing the write data in the tile-aware cache 118 and, based on query of a lookup table by buffer/tile mapping module 116, delaying partial-tile write transactions to memory component 108 until full-tile writes can be serviced. That is, the tile manager module 120 may assemble multiple linearly addressed data write requests into a full-tile write transaction.

In addition to, or alternatively to, the above-described tile-unaware processor 104, the SoC 102 may include a tile-aware processor 126. The tile-aware processor 126 may communicate with the address aperture 106 and the memory component 108 over the bus 110 in the same manner described above with regard to the tile-unaware processor 104. One or more processes 128 may be executing on the processor 126. In the illustrated embodiment, the processor 126 is associated with a tile-aware cache 130 and, as such, the processor 126 and processes 128 that utilize the tile-based organization of the cache 130 may be referred to as being tile-aware. It should be understood that the processor 126 (under control of a process 128) nonetheless makes memory access requests to the memory component 108 using a linear (non-tile) address provided to the address aperture 106. The tile-aware processor 126 or a process 128 executing thereon is tile-aware because it is configured to manipulate and reference data in the tile-based or tile-aware cache 130 on a tile granularity. For example, the tile-aware processor 126 may efficiently issue multiple linearly addressed data access requests that collectively define an entire tile. Although not separately shown for purposes of clarity, the cache 130 may include conventional eviction logic and evict data in a conventional manner, based on conventional policies such as least-recently-accessed data.

Figure 4:
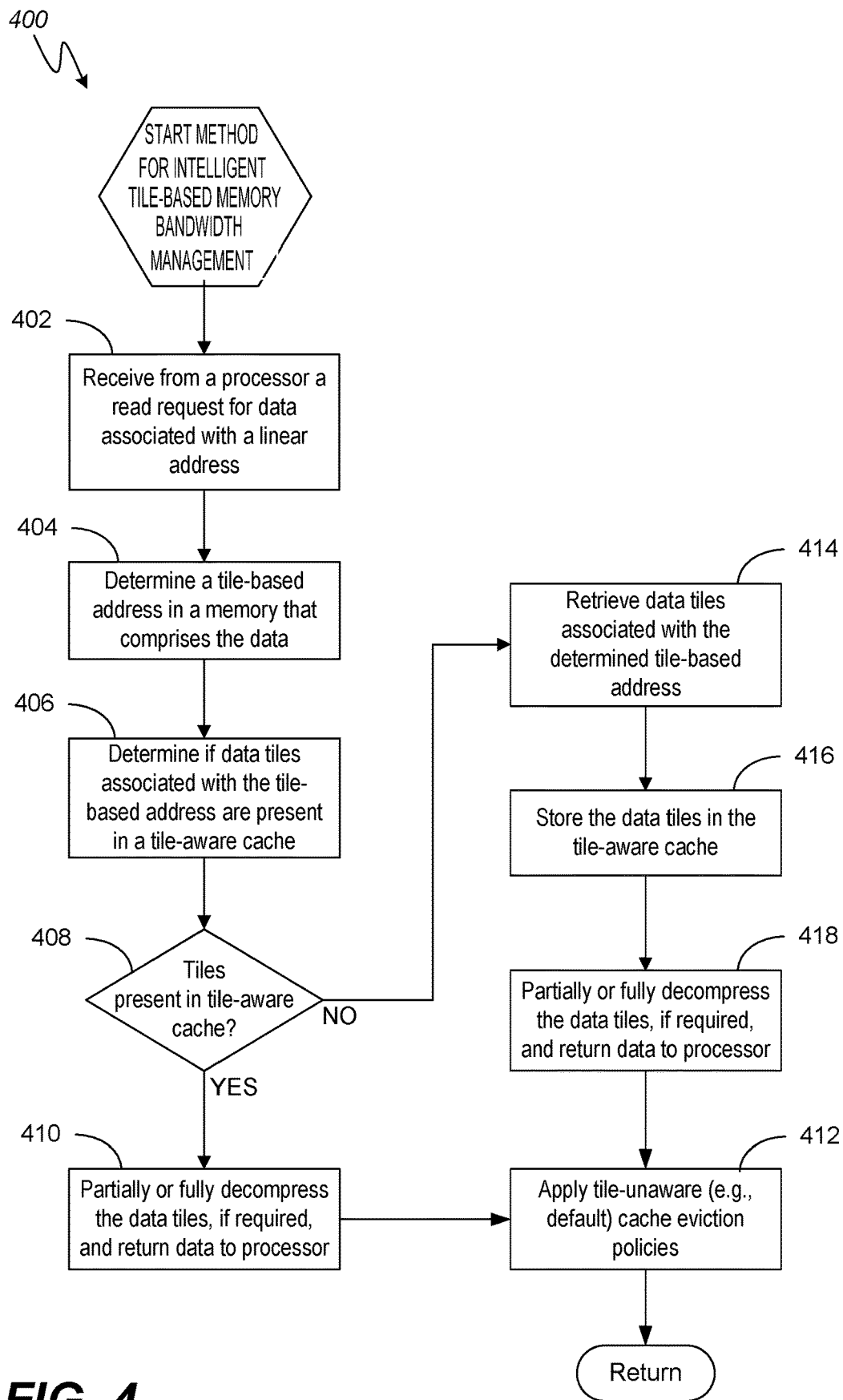
FIG. 4 is a logical flowchart illustrating a method for intelligent tile-based memory bandwidth management directed to servicing a linearly addressed data read request, in accordance with exemplary embodiments.

FIG. 4 illustrates an exemplary method 400 for intelligent tile-based memory bandwidth management directed to servicing a linearly addressed data read request. Although the method 400 may be especially beneficial in the case of read requests produced by the tile-unaware processor 104, the method 400 is potentially applicable in the case of read requests produced by the tile-aware processor 126, though perhaps with less effective results or even deleterious effects. Beginning at block 402, the compression address aperture 106 may receive from the tile-unaware processor 104 a read request for data associated with a linear aperture address. Next, at block 404, the compression address aperture 106 may determine a tile-based alias address in the memory component 108 that comprises the compressed data needed in order to service the read request. It is envisioned that the mapping of the linear address to the tile-based address of the memory component 108 may be accomplished any number of ways including, but not necessarily limited to, using a limited number of pre-programmable address range check registers in the compression address aperture that define the linear address to tile-based buffer lookup table, using a programmable lookup data structure stored in DRAM or cache and fetched on-demand, and/or using a direct encoding of the buffer index and X/Y offset into the linear address by leveraging the X/Y aperture concept.

Returning to the method 400 at block 406, the method 400 first determines if the data tiles of the tile-based alias address have been previously fetched to service a previous read request and are stored in the tile-aware cache 118 of the compression address aperture 106. As indicated by decision block 408, if the needed tiles are in the tile-aware cache 118, no fetch of the tiles from the memory component 108 is required, and so the "yes" branch is followed to block 410, and the data in the tiles is partially or fully decompressed from the tiles in the tile-aware cache 118 (if not already decompressed) and provided to the processor 104 in service to the read request.

Following block 410, the method 400 may, at some time after the read request is serviced, apply cache eviction policies at block 412. That is, it may be determined whether to evict tiles and, if so, which tiles to evict. As the read request is from the tile-unaware processor 104 in this example, the applied cache eviction policies may be of a conventional, tile-unaware type, such as prioritizing eviction of the least recently used tiles. Conventional (i.e., tile-unaware) cache eviction hardware or firmware may be included in the free-space manager 124 (FIG. 3), which in a manner described below is also configured to apply tile-aware cache eviction policies and other tile-aware free-space management policies, such as tile-aware allocation (or even non-allocation) of storage space from available or free space in the tile-aware cache 118.

Returning to decision block 408, if the needed tiles are not in the tile-aware cache 118, the method 400 follows the "no" branch to block 414, and the data tiles in memory component 108 containing the data required to service the read request from the processor 104 are retrieved or fetched from the tile-based address of memory component 108. Next, at block 416, the data tiles are stored in the tile-aware cache 118 in anticipation of being needed to service future read requests. At block 418, the data in the tiles is partially or fully decompressed, if not already in a decompressed state, and provided to the processor 104 in service to the read request. In the same manner as described above with regard to block 412, at sonic time following return of data tiles to the processor 104 at block 418, the method 400 may apply cache eviction policies.

Figure 5:
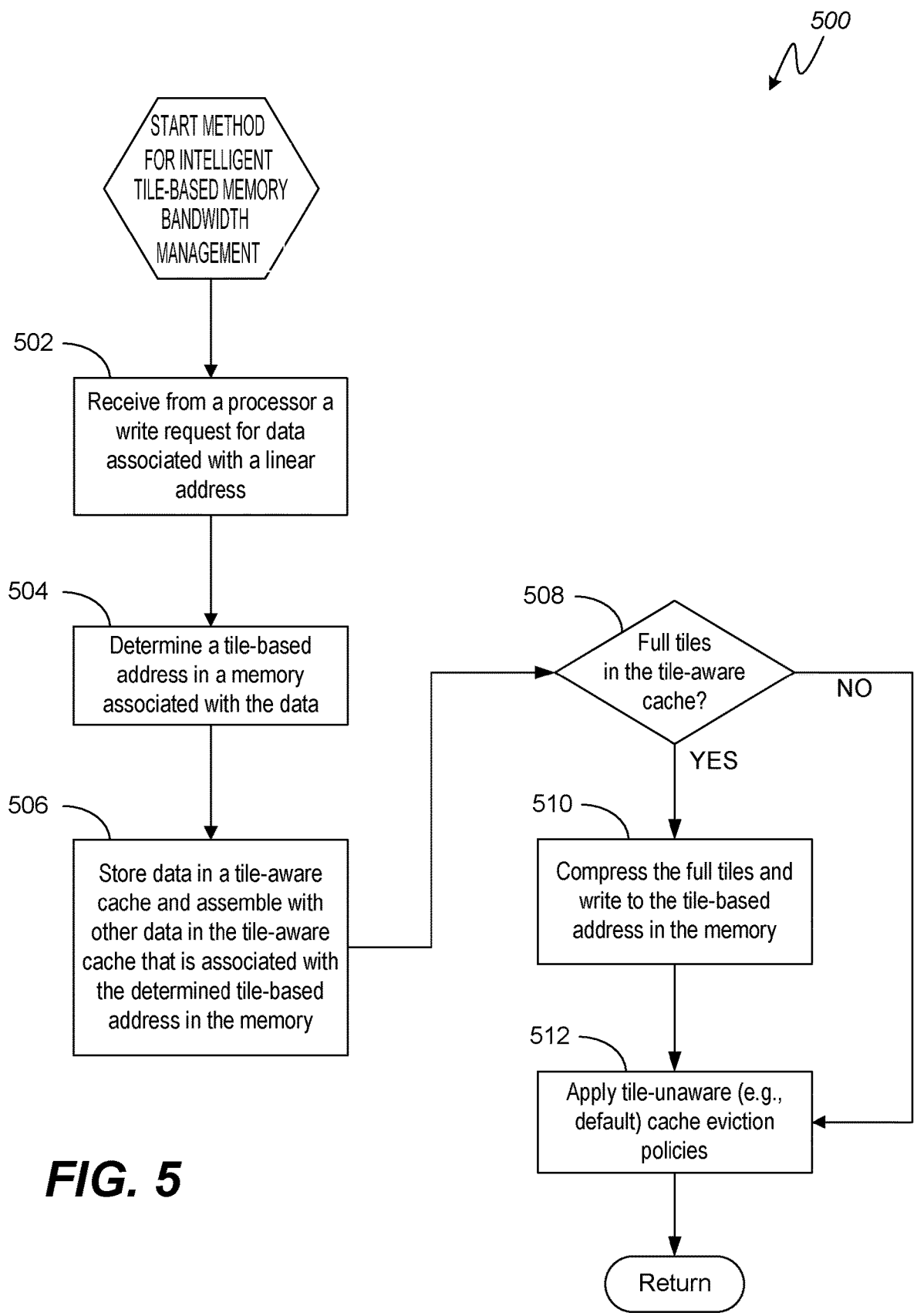
FIG. 5 is a logical flowchart illustrating a method for intelligent tile-based memory bandwidth management directed to servicing a linearly addressed data write request, in accordance with exemplary embodiments.

FIG. 5 illustrates an exemplary method 500 for intelligent tile-based memory bandwidth management directed to servicing a linearly addressed data write request. Although the method 500 may be especially beneficial in the case of write requests produced by the tile-unaware processor 104, the method 500 is potentially applicable in the case of write requests produced by the tile-aware processor 126, though perhaps with less effective results or even deleterious effects. Beginning at block 502, the compression address aperture 106 may receive from the tile-unaware processor 104 a write request for data associated with a linear aperture address. Next, at block 504, the compression address aperture 106 may determine a tile-based alias address in memory component 108 that is associated with the write data. At block 506, the data of the write request may be stored in the tile-aware cache 118 of the compression address aperture 106 and assembled with other data in the cache 118 designated to be written to the memory component 108 and also associated with the tile-based alias address. As indicated by decision block 508, it is determined whether one or more full or entire tiles of data are assembled and ready for compression and writing to the memory component 108. If no full tiles are assembled, the method 500 follows the "no" branch and, but for cache management as described below, is completed. If one or more full tiles are assembled, from decision block 520 the method 500 follows the "yes" branch to block 510.

At block 510, the one or more assemblies of linear data forming one or more full or entire tiles of data are compressed and written to the appropriate tile-based address in the alias range of memory component 108. In this way, the method 500 avoids partial-tile compression and writes to the memory component 108 when the tile-unaware processor is issuing linear write requests that do not by themselves map to a full tile block of compressed data.

After block 510, or if the "no" branch of decision block 508 is followed, the method 500 may, at sonic time after the write request is serviced, apply cache eviction policies at block 512. That is, it may be determined whether to evict tiles and, if so, which tiles to evict. As the write request is from the tile-unaware processor 104 in this example, the cache eviction policies may be of a conventional, tile-unaware type, such as prioritizing eviction of the least recently used tiles.

Figure 6:
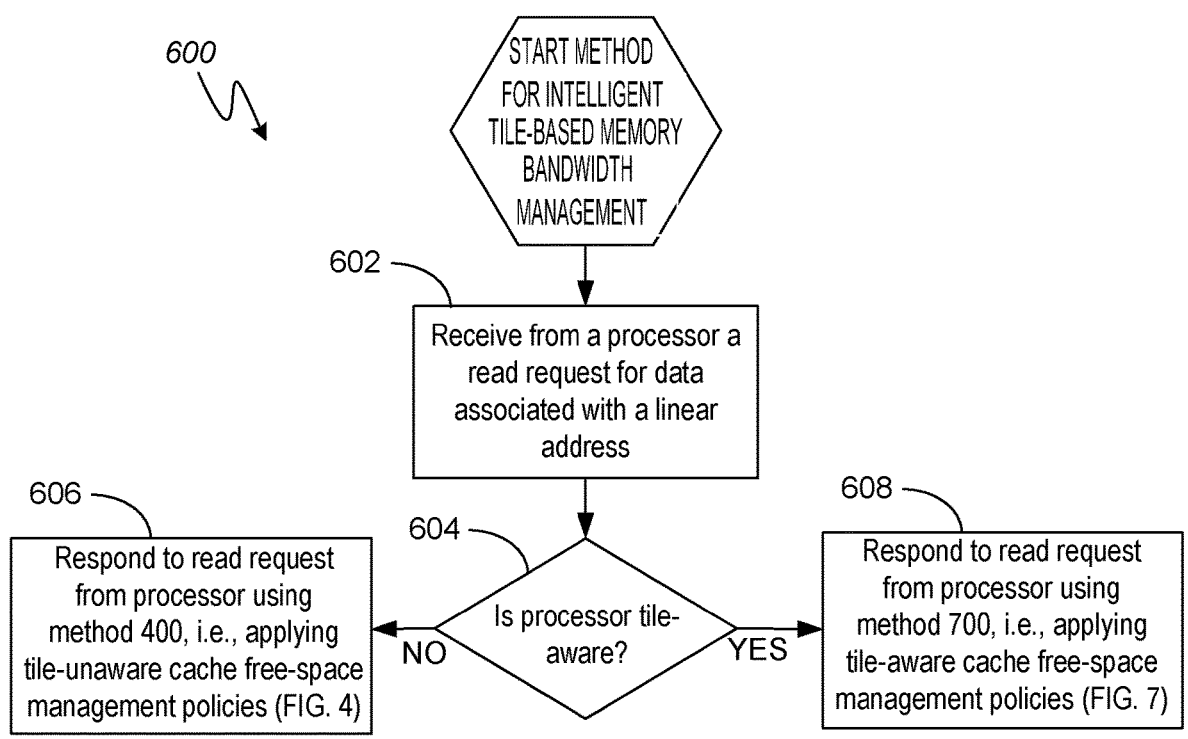
FIG. 6 is a logical flowchart illustrating a method for responding to a linearly addressed data read request depending upon a determination of whether the requesting processor is tile-unaware or tile-aware, in accordance with exemplary embodiments.

FIG. 6 illustrates a method 600 for intelligent tile-based memory bandwidth management in response to a data read request from a processor. In accordance with the method 600, the address aperture 106 distinguishes between read requests from tile-unaware and tile-aware processing components, such as the tile-unaware processor 104 and the tile-aware processor 126 (FIG. 3), and manages the tile-aware cache 118 accordingly. In particular, the method 600 relates to managing free space in the tile-aware cache 118. Managing free space refers to applying cache management policies relating to allocation of space for storing data, eviction of stored data to free up space, or a combination of both.

Beginning at block 602, the compression address aperture 106 (FIG. 3) may receive a data read request from a processor for data associated with a linear aperture address. At decision block 604, the compression address aperture 106 may determine whether the requesting processor is tile-unaware (e.g., processor 104) or tile-aware (e.g., processor 126).

Any method may be used to determine whether a requesting processor is tile-unaware or tile-aware. In one example of such a method, the requesting processor may set a tag bit (not separately shown) on the memory bus 110 (FIG. 3). The address aperture 106 may read the tag bit and then remove it or separate it from the remaining bits before processing the remaining bits. In another example of such a method, the metadata described above with regard to FIG. 1 that is associated with a compressed tile may include a bit or other information indicating whether the tile, or image buffer in which a tile may be contained, is expected to be accessed by a tile-unaware processor or a tile-aware processor. The address aperture 106 may read this information from the metadata when it receives a read request for the associated data. This method is based on an observation or presumption that tile-aware and tile-unaware processors typically do not concurrently access the same buffers as each other. In still another example of such a method, the address aperture 106 may set and start a timer (not shown) if the address aperture 106 receives an initial partial-tile read request to a tile that is not currently in its tile-aware cache 118. The timer begins counting (i.e., either counting down to zero from a set value or counting up from zero to a set value). If the address aperture 106 receives another such partial-tile read request to the same tile before the timer expires (i.e., reaches zero or the set value), the timer is re-set and begins counting again. If the entire tile is accessed before the timer expires, the address aperture 106 determines that the requesting processor is tile-aware, If the timer expires before the entire tile is accessed, the address aperture 106 determines that the requesting processor is tile-unaware. The timer method is based on an observation or presumption that a tile-aware processor will typically access an entire tile within a relatively short time interval. Still other methods for determining whether a requesting processor is tile-unaware or tile-aware may occur readily to one of ordinary skill in the art in view of these examples.

Referring again to decision block 604, if the address aperture 106 determines that the requesting processor is not tile-aware (i.e., is tile-unaware), the method 600 follows the "no" branch to block 606. Block 606 may include, for example, all or a portion of the above-described method 400 (FIG. 4). As described above with regard to method 400, the response to a data read request may include not only servicing the request but also applying tile-unaware (e.g., conventional) cache free-space management policies. However, if the address aperture 106 determines that the requesting processor is tile-aware, the method 600 follows the "yes" branch to block 608. Block 608 represents an example of a method that may be similar to method 400 except that tile-aware cache free-space management policies are applied. As mentioned above, such policies may include, in the case of servicing a read request, tile-aware allocation of space in the otherwise tile-unaware cache 118.

Figure 7:
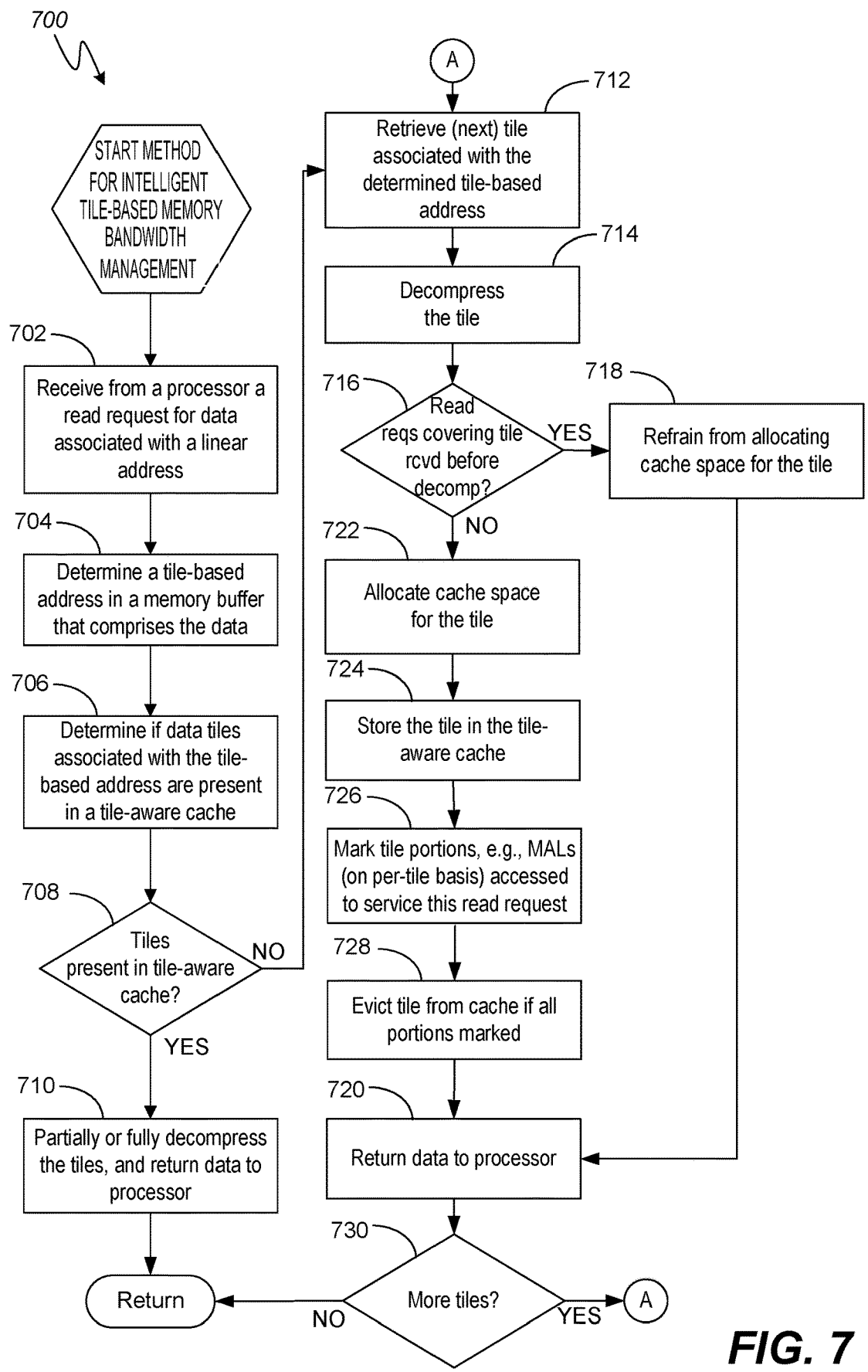
FIG. 7 is a logical flowchart illustrating a method for intelligent tile-based memory bandwidth management directed to servicing a linearly addressed data read request from a tile-aware processor, in accordance with exemplary embodiments.

FIG. 7 illustrates a method 700 for intelligent tile-based memory bandwidth management that may be performed when it is determined that a processor requesting a data read operation is tile-aware. Some or all of the method 700 may be an example of above-referenced block 608 (FIG. 6). The (tile-aware read) method 700 differs from the above-described (tile-unaware read) method 400 primarily in the management of cache free space (e.g., allocation). Accordingly, the first several steps of the method 700 are similar to those described above with regard to the method 400. Such steps are therefore described briefly, as follows. The method 700 may begin at block 702 when the address aperture 106 receives from a tile-aware processor (e.g., tile-aware processor 126) a read request for data associated with a linear aperture address. At block 704, the address aperture 106 may determine a tile-based alias address in the memory component 108 that comprises the compressed data needed in order to service the read request. At block 706, the address aperture 106 may determine if the data tiles of the tile-based alias address have been previously fetched to service a previous read request and are stored in the tile-aware cache 118. As indicated by decision block 708, if the needed tiles are in the tile-aware cache 118, no fetch of the tiles from the memory component 108 is required, and so the "yes" branch is followed to block 710. At block 710, the data in the tiles is partially or fully decompressed from the tiles in the tile-aware cache 118 (if not already decompressed) and returned to the processor 104 in service of the read request.

Returning to decision block 708, if the needed tiles are not in the tile-aware cache 118, the method 700 follows the "no" branch to block 712, and a data tile in the memory component 108 containing data required to service the read request from the processor 104 is retrieved or fetched from the tile-based address of memory component 108. As noted below, the method 700 includes a loop back to block 712 to repeat the process for each additional tile that may be required to service the read request if more than one tile is required. Next, at block 714, the data tile is decompressed, if not already in a decompressed state.

It should be noted that the decompression indicated by block 714 takes some non-zero amount of time, and that while the decompression is in progress the address aperture 106 may receive additional read requests for the same tile that is being decompressed. As indicated by the decision block 716, the address aperture 106 may determine whether, at the time it completes the decompressing the tile, it has received read requests covering or corresponding to the entire tile (i.e., all portions of that tile). If the address aperture 106 has received read requests covering the entire tile by the time it completes decompressing the tile, the address aperture 106 may refrain from allocating space in its tile-aware cache 118 for the tile, as indicated by block 718. Accordingly, if the address aperture 106 has received read requests covering the entire tile by the time it completes decompressing the tile, the address aperture 106 does not cache the tile. Caching the tile is not necessary because the tile-aware processor has already requested all the data in the tile and is unlikely to soon request data in the tile again. Rather, the address aperture 106 may simply return the data of the tile to the requesting tile-aware processor at block 720 without allocating cache space for the tile. Refraining from allocating cache space under the circumstances described above is a cache management policy that may be advantageously applied when the address aperture 106 has determined that a requesting processor is tile-aware.

Returning to decision block 716, if at the time the address aperture 106 has completed decompressing the tile, the address aperture 106 has not received read requests covering the entire tile, the address aperture 106 may allocate space for the tile in its tile-aware cache 118, as indicated by block 722. Then, as indicated by block 724, the address aperture 106 may store the tile in the allocated space in the tile-aware cache 118, as indicated by block 724.

The address aperture 106 may maintain a "scoreboard" data structure (not shown) that indicates which portions of a tile in the tile-aware cache 118 have been accessed. As noted above, a tile may be divided into units of MAL, for example. Each portion of a tile may represent one MAL. A tile of H height and W width thus consists of H×W MALs of data. Accordingly, a scoreboard may have a two-dimensional array structure of H×W cells, in which each cell may contain a marker (e.g., a bit) indicating Whether the corresponding portion of the tile has been accessed. One scoreboard may be provided for each tile in the tile-aware cache 118.

At block 726, the address aperture 106 records information identifying portions of tiles accessed to service the read request. For example, for each portion of each tile, the address aperture 106 may set the value of a bit in a cell of the scoreboard corresponding to an accessed portion. The address aperture 106 may record in this manner the read requests it received for portions of the tile while decompressing the tile (block 714) as well as any other read requests it may subsequently receive for additional portions of the tile.

As indicated by block 728, the address aperture 106 may monitor the scoreboard to determine whether all cells of a scoreboard have been marked, thereby indicating that all portions of the corresponding tile in the tile-aware cache 118 have been accessed. If the address aperture 106 determines that all portions of a tile in the tile-aware cache 118 have been accessed, the address aperture 106 may timely evict the tile from the tile-aware cache 118, "Timely" means either immediately evicting or, alternatively, prioritizing a tile for eviction over other tiles that have not been prioritized in this manner. Immediately evicting or prioritizing eviction of tiles under the circumstances described above is a cache management policy that may be advantageously applied when the address aperture 106 has determined that the requesting processor is tile-aware. It should be understood that the free-space manager 124 (FIG. 3) may be configured not only with conventional cache eviction policies (which may be embodied in hardware, firmware, etc.) but also with tile-aware cache allocation, cache eviction, or other cache free-space management policies. That is, the tile-aware cache management policies described herein may be provided in conjunction with conventional (i.e., cache-unaware) cache allocation, cache eviction, etc., policies.

As indicated by block 730, the steps described above with regard to block 712-728 are applied to each tile that is implicated by a read request from the tile-aware processor. When all requested data pertaining to the read request has been returned to the tile-aware processor, the method 700 is complete or returns to continue whatever actions may have been occurring before the method 700 was begun.

Figure 8:
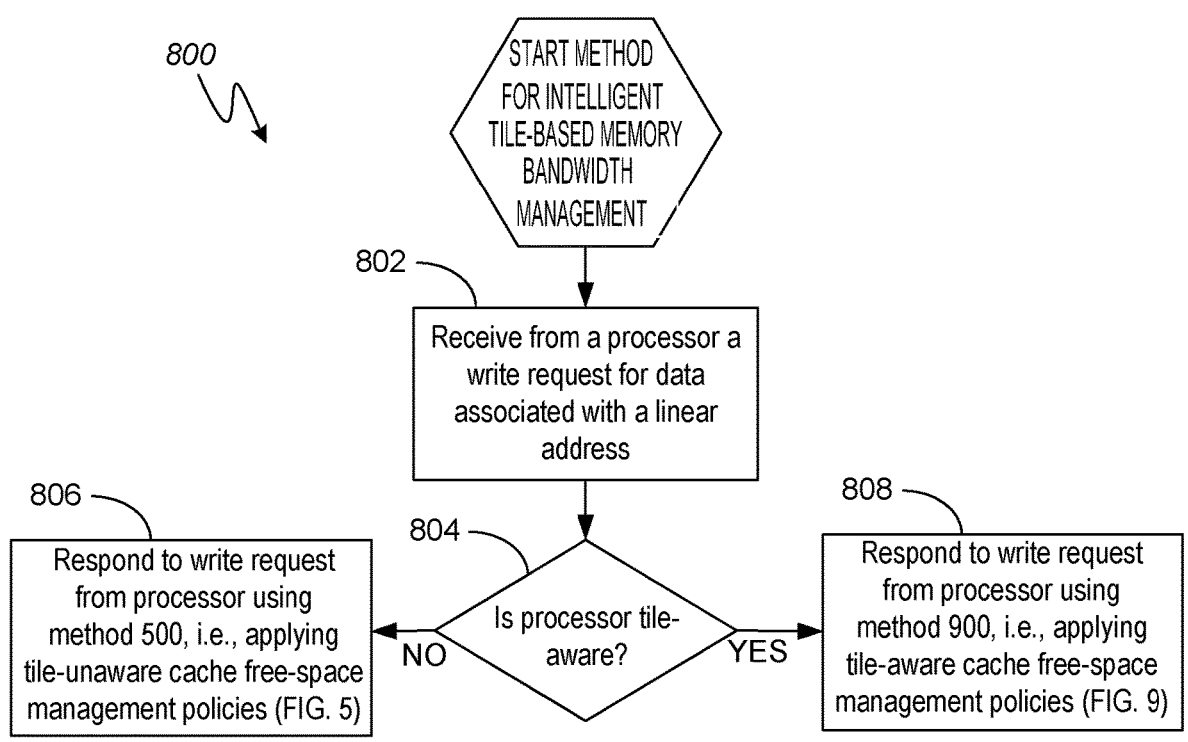
FIG. 8 is a logical flowchart illustrating a method for responding to a linearly addressed data write request depending upon a determination of whether the requesting processor is tile-unaware or tile-aware, in accordance with exemplary embodiments.

FIG. 8 illustrates a method 800 for intelligent tile-based memory bandwidth management in response to a data write request from a processor. In accordance with the method 800, the address aperture 106 distinguishes between write requests from tile-unaware and tile-aware processing components, such as the tile-unaware processor 104 and tile-aware processor 126 (FIG. 3), and manages its tile-aware cache 118 accordingly. In particular, the method 800 relates to managing free space in its tile-aware cache 118.

Beginning at block 802, the compression address aperture 106 may receive a data read request from a processor for data associated with a linear aperture address. At decision block 804, the compression address aperture 106 may determine whether the requesting processor is tile-unaware (e.g., processor 104) or tile-aware (e.g., processor 126). The methods described above with regard to FIG. 6 may be used to determine whether a requesting processor is tile-unaware or tile-aware.

Referring again to decision block 804, if the address aperture 106 determines that the requesting processor is not tile-aware (i.e., is tile-unaware), the method 800 follows the "no" branch to block 806. Block 806 may include, for example, all or a portion of the above-described method 500 (FIG. 5). As described above with regard to method 500, the response to a data write request includes not only servicing the request but also includes applying tile-unaware (e.g., conventional) cache free-space management policies. However, if the address aperture 106 determines that the requesting processor is tile-aware, the method 800 follows the "yes" branch to block 808. Block 808 represents an example of a method that may be similar to method 500 except that tile-aware cache free-space management policies are applied. As mentioned above, in the case of servicing a write request, such policies may include tile-aware eviction of data to free up space in the otherwise tile-unaware cache 118.

Figure 9:
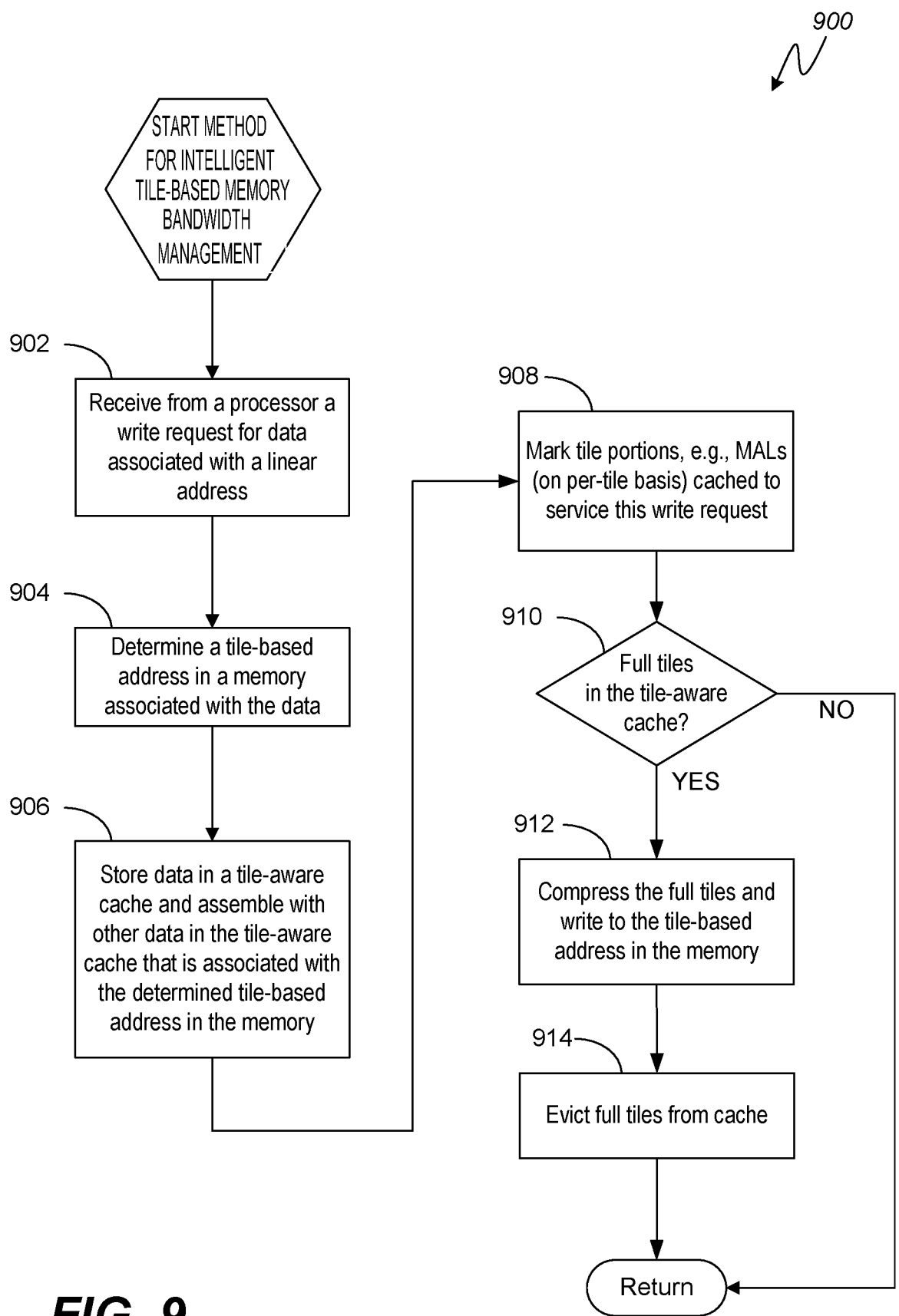
FIG. 9 is a logical flowchart illustrating a method for intelligent tile-based memory bandwidth management directed to servicing a linearly addressed data write request from a tile-aware processor, in accordance with exemplary embodiments.

FIG. 9 illustrates a method 900 for intelligent tile-based memory bandwidth management that may be performed when it is determined that a processor requesting a data write operation is tile-aware. Some or all of the method 900 may be an example of above-referenced block 808 (FIG. 8). The (tile-aware write) method 900 differs from the above-described (tile-unaware write) method 500 primarily in the management of cache free space (e.g., eviction). Accordingly, the first several steps of the method 900 are similar to those described above with regard to the method 500. Such steps are therefore described briefly, as follows. The method 900 may begin at block 902 when the address aperture 106 receives from a tile-aware processor (e.g., tile-aware processor 126) a write request for data associated with a linear aperture address. Next, at block 904, the compression address aperture 106 may determine a tile-based alias address in memory component 108 that is associated with the write data.

At block 906, the data of the write request may be stored in the tile-aware cache 118 of the compression address aperture 106 and assembled with other data in the cache 118 designated to be written to the memory component 108 and also associated with the tile-based alias address. Then, at block 908 the above-described scoreboard data structure may be updated or marked. As described above, the scoreboard indicates which portions of a tile in the tile-aware cache 118 have been accessed. The same scoreboard data structure may be used in method 900 as in method 700, based on an observation or presumption that a tile-aware processor, minimizing the time spent accessing each tile, will either be reading a partially-accessed tile or writing a partially-accessed tile, but not concurrently reading and writing the same tile. Thus, the address aperture 106 may record information in the scoreboard identifying portions of tiles accessed to service the write request.

At decision block 910, the address aperture 106 may monitor the scoreboard to determine whether all cells of a scoreboard have been marked, thereby indicating that all portions of the corresponding tile in the tile-aware cache 118 have been accessed, If the address aperture 106 determines that all portions of a tile in the tile-aware cache 118 have not been accessed, the "no" branch of decision block 510 is followed, and the method 900 is complete or returns to continue whatever actions may have been occurring before the method 900 was begun. If the address aperture 106 determines that all portions of a tile in the tile-aware cache 118 have been accessed (i.e., the full or entire tile has been accessed), the "yes" branch of decision block 510 is followed, and the one or more assemblies of linear data forming one or more full or entire tiles of data are compressed and written to the appropriate tile-based address in the alias range of memory component 108, as indicated by block 912. In this way, the method 900 avoids partial-tile compression and writes to the memory component 108 when the tile-unaware processor is issuing linear write requests that do not by themselves map to a full tile block of compressed data. Then, at block 914 the address aperture 106 may timely evict the full tile from the tile-aware cache 118.

Note that although for purposes of clarity some of blocks 902-914 may be described above in terms of a single tile, each block or step of the method 900 may in some instances apply to more than one tile. That is, in accordance with the method 900, in response to a single write request, zero, one, or more than one tile may be compressed and written to the memory component 108, and zero, one, or more than one tile may be evicted from the tile-aware cache 118.

Figure 10:
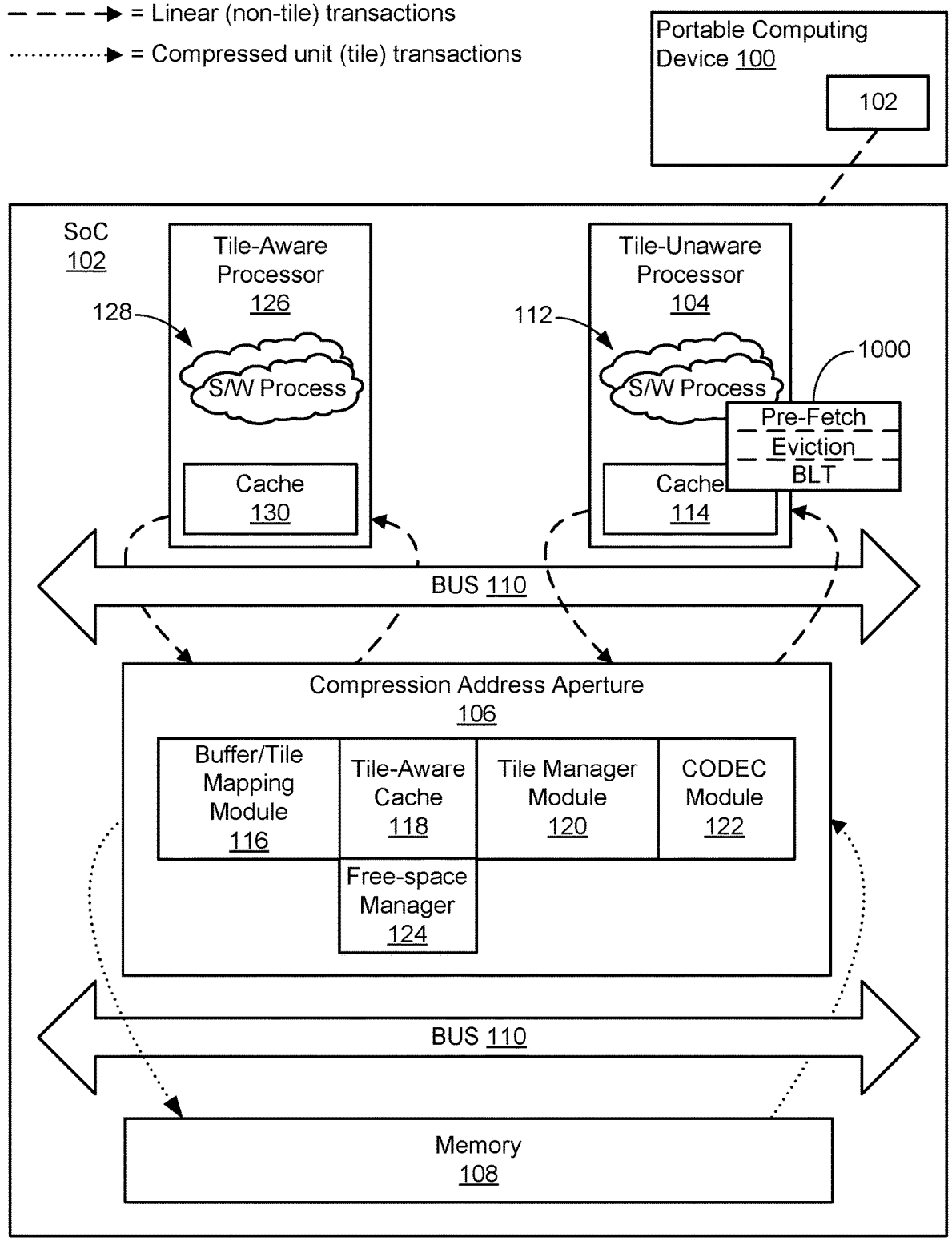
FIG. 10 is a functional block diagram illustrating another on-chip system configured for intelligent tile-based memory bandwidth management, in accordance with exemplary embodiments.

FIG. 10 illustrates another exemplary embodiment, in which the SoC 102 is configured as described above with regard to FIG. 3 except for the inclusion of a tile-aware processing component 1000. The tile-aware processing component 1000 is configured to operate in association with the tile-unaware processor 104. For example, the tile-aware processing component 1000 may comprise hardware, software (or firmware, etc), or a combination of hardware and software, that directly interfaces with the tile-unaware processor 104 (i.e., not via a bus shared with other components), that comprises a distinct portion or block of the tile-unaware processor 104, or that executes on the tile-unaware processor (e.g., one of processes 112). In other words, the tile-aware processing component 1000 may effectively serve as an extension to the processor 104. The tile-aware processing component 1000 may extend the otherwise tile-unaware processor 104 (or a tile-unaware process 112 executing thereon) with certain tile-aware features. Three examples of such tile-aware features are described below: tile-aware pre-fetch, tile-aware eviction, and tile-aware bit block transfer ("BLT"). As described in further detail below, in response to detecting a data access request, the tile-aware processing component 1000 may generate linear aperture addresses that collectively correspond to an entire tile. This generation of linear aperture addresses underlies the tile-aware pre-fetch, tile-aware eviction, and tile-aware bit block transfer features.

Although the embodiment illustrated in FIG. 10 includes the tile-aware processing component 1000 in addition to the features described above with regard to FIGS. 3-9 relating to tile-aware cache free-space management in response to access requests from tile-aware processors, the tile-aware processing component 1000 is independent of the features described above relating to tile-aware cache free-space management in response to access requests from tile-aware processors. That is, an embodiment may include both a tile-aware processing component 1000 and tile-aware cache free-space management, a tile-aware processing component 1000 without tile-aware cache free-space management, or tile-aware cache free-space management without a tile-aware processing component 1000.

Figure 11:
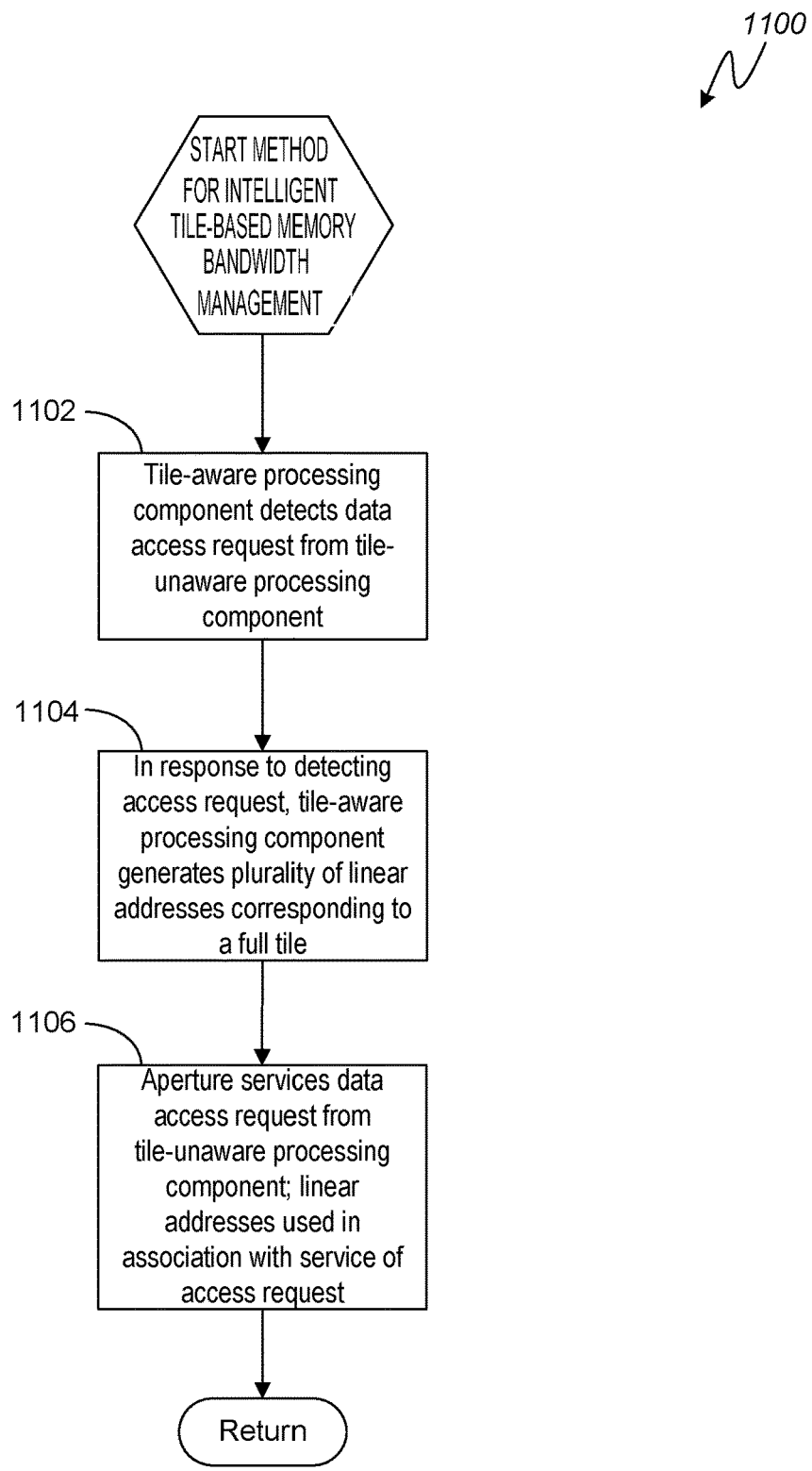
FIG. 11 is a logical flowchart illustrating a method for intelligent tile-based memory bandwidth management directed that may be performed or controlled by a tile-aware processing component operating in association with a tile-unaware processing component, in accordance with exemplary embodiments.

FIG. 11 illustrates a method 1100 that may be performed or controlled by the tile-aware processing component 1000. At block 1102, the tile-aware processing component 1000 may detect a data access request, such as a read request, a write request, or a bit block transfer, from an associated tile-unaware processing component, such as the tile-unaware processor 104 (or a tile-unaware process 112 executing thereon). As described more fully below with regard to the examples illustrated in FIGS. 15-17, the data access request may be directed to a memory region in the address aperture 106, such as the tile-aware cache 118. At block 1104, in response to detecting the access request, the tile-aware processing component 1000 generates a plurality of linear addresses that correspond to a full or entire tile. At block 1106, the address aperture 106 may service the access request from the tile-unaware processor 104. The generated linear addresses are used in association with the servicing of the access request. Examples of method 1100 relating to tile-aware pre-fetch in association with a read request, tile-aware eviction in association with a write request, and tile-aware bit block transfer are described below.

Figure 12:
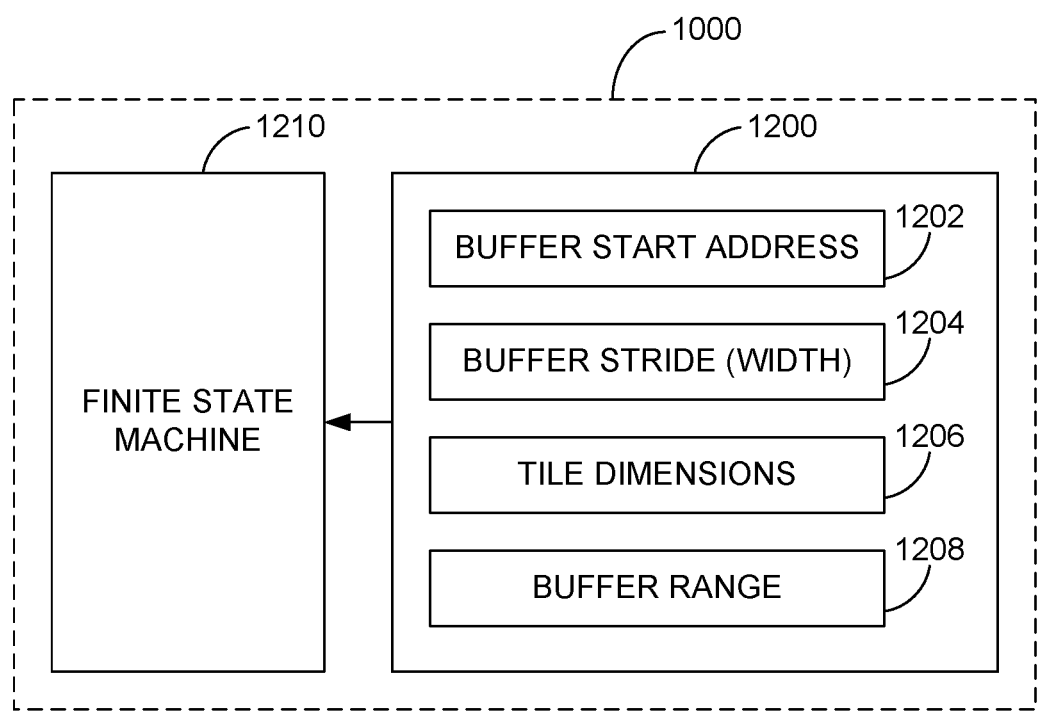
FIG. 12 illustrates a portion of a tile-aware processing component that may operate in association with a tile-unaware processing component, in accordance with exemplary embodiments.

FIG. 12 illustrates an example of a portion of the tile-aware processing component 1000 that may include hardware such as registers 1200 and a finite state machine 1210 or similar control logic. It is envisioned that the tile-aware processing component 1000 may serve as a tool that the tile-unaware processor component may selectively utilize. For example, it is envisioned that in a software design context, a programmer or designer of software underlying a tile-unaware process 112 may provide the otherwise tile-unaware process 112 with certain tile-aware features through a programming interface with the tile-aware processing component 1000. Such a programming interface may enable the tile-unaware process 112 to load tile information values into the registers 1200 and otherwise enable the tile-aware features. The registers 1200 may include, for example, a buffer start address register 1202, a buffer stride (i.e., width) register 1204, a tile dimensions register 1206, and a buffer range register 1208. Broadly described, the finite state machine 1210 is configured to receive as input the tile information values that have been loaded into the registers 1200, monitor for data access requests (e.g., from the associated tile-unaware process 112), and translate any such data access requests from associated the tile-unaware process 112 into tile-aware data access requests. The finite state machine 1210 is further configured to, in response to detecting such a data access request, generate the above-described plurality of linear addresses that collectively correspond to the entire tile. An example in which a tile-unaware process 112 may load the registers 1200 with tile information values is described below with regard to FIG. 13.

Figure 13:
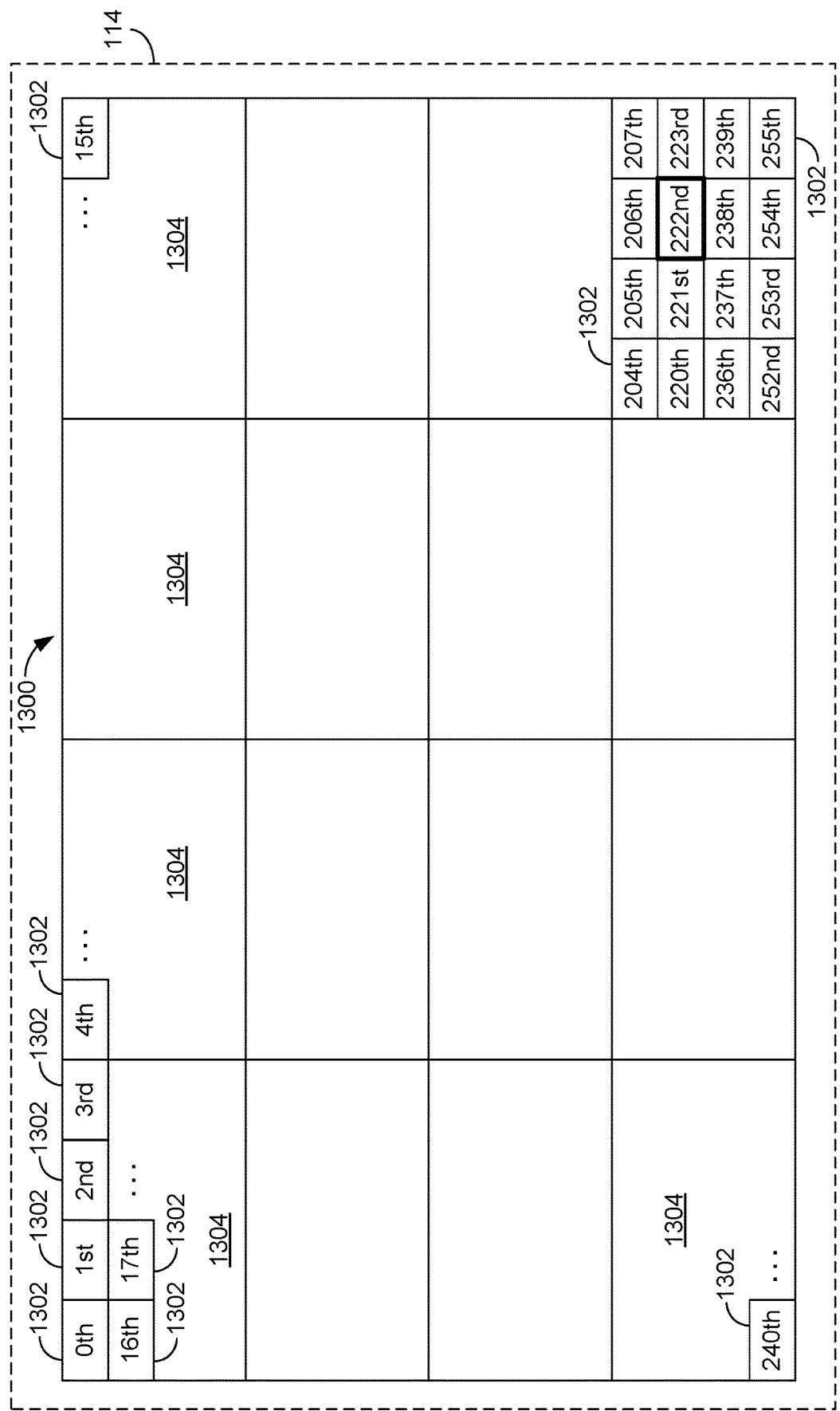
FIG. 13 illustrates a buffer configured to store data in a linear address space in a tile-unaware cache of a processor, in accordance with exemplary embodiments.

FIG. 13 illustrates an exemplary buffer 1300 that is configured to store data in a linear (i.e., non-tiled-based) address space. The buffer 1300 may be allocated, for example, in the tile-unaware cache 114 of the processor 104. In the example illustrated in FIG. 13, the buffer 1300 consists of 256 portions or units 1302, each of which may have a size of, for example, one MAL or an integer multiple of one MAL. Ordinarily, i.e., absent the tile-aware processing component 1000, the tile-unaware process 112 executing on the (otherwise tile-unaware) processor 104 would be unaware of any corresponding tile-based address space, such as the tile-based or alias address space in which the address aperture 106 addresses the memory component 108. That is, absent the tile-aware processing component 1000, the tile-unaware process 112 would not be configured to operate in the tile-based address space. Nevertheless, the tile-unaware process 112 may use the tile-aware processing component 1000 to enable certain tile-aware features that operate in the tile-based address space.

As an example of a tile-based address space or tile-based organization, the buffer 1300 in the illustrated example may be characterized by 16 tiles 1304, each consisting of 16 units 1302. Each unit 1302 in the illustrated example may have dimensions of four pixels in width by four pixels in height, i.e., 4×4. The buffer 1300 in the illustrated example thus may be characterized as ranging from a starting buffer address of 0 (at which the 0th unit 1302 is located) to an ending buffer address of 255 (at which the 255th unit 1302 is located).

The buffer 1300 in the illustrated example further may be characterized by a stride or width of 16 units 1302. Thus, for example, the first line of the buffer 1300 ends at the 15th unit 1302, and the second line of the buffer 1300 begins at the 16th unit 1302.

Enabling the tile-aware processing component 1000 to provide one or more tile-aware features may include the tile-unaware process 112 storing a starting buffer address, buffer stride, tile dimensions, and a buffer range in the registers 1202-1208 (FIG. 12), respectively. In accordance with the example described above with regard to the buffer 1300, the tile-unaware process 112 may store a starting buffer address of "0" in the starting buffer address register 1202, store a buffer stride of "16" in the buffer stride register 1204, store tile dimensions of "4×4" in the tile dimensions register 1206, and store a buffer range of "255" in the buffer range register 1208.

Figure 14:
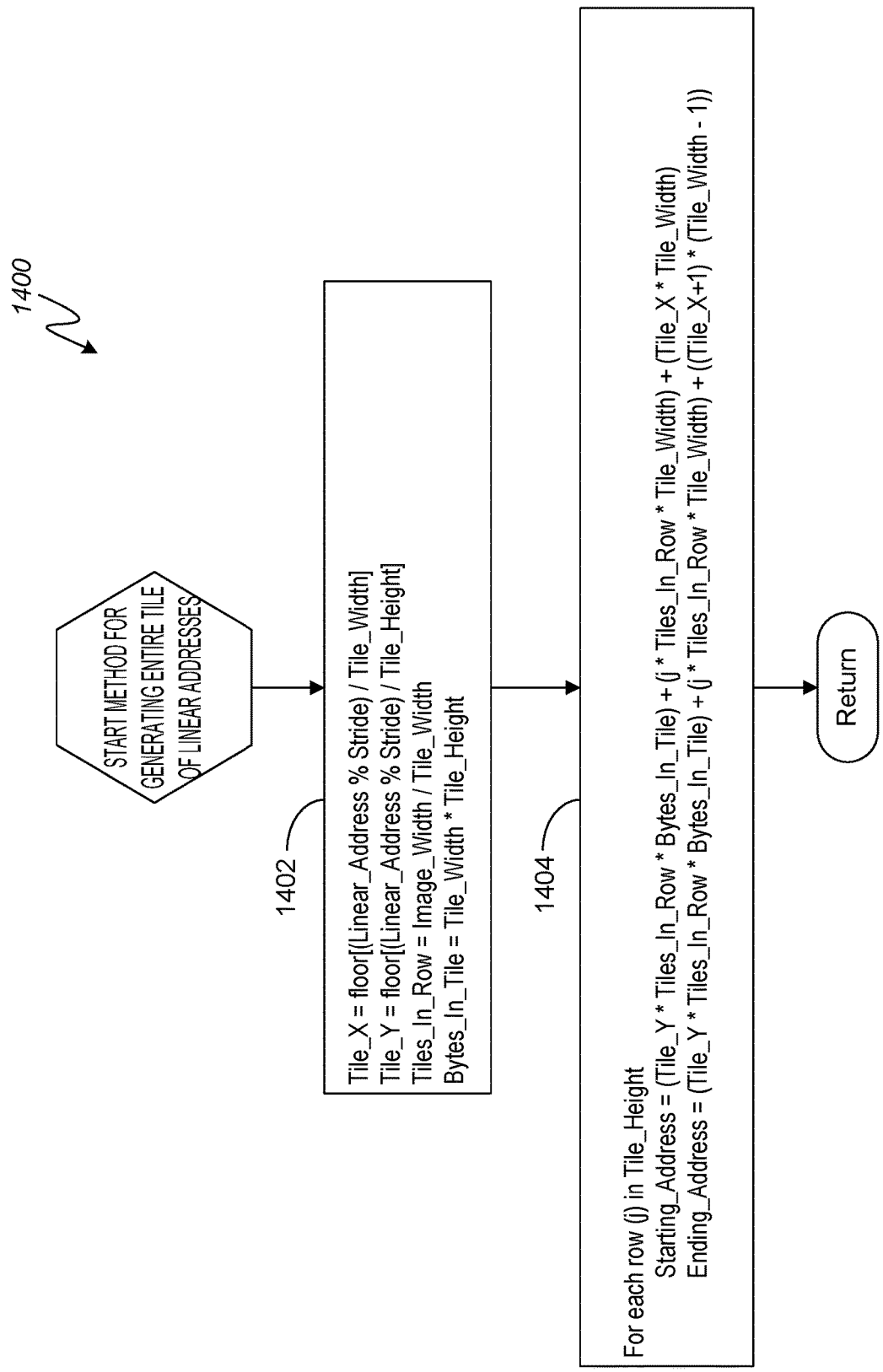
FIG. 14 is a logical flowchart illustrating a method for generating a full tile of linear addresses, in accordance with exemplary embodiments.

FIG. 14 illustrates an exemplary method 1400 that may be used to implement the address generation described above with regard to block 1104 (FIG. 11). First, the tile coordinates (Tile_X, Tile_Y) for the tile encompassing the original linear address provided by the tile-unaware process 112 may be calculated, as indicated by block 1402. Then, for each row of the tile, the starting linear address and ending linear address may be calculated. An exemplary method or formula for such a calculation is shown in block 1404. In this manner, a plurality of linear addresses that collectively correspond to the entire tile may be generated.

In the following example, a data access request is associated with a linear address of 222. With reference again to FIG. 13, the data access request may be a data read request or data write request to the 222nd unit 1302. Using the formula in block 1402 (FIG. 14), it may be determined that Tile_X=floor(222% 16/4)=3, and Tile_Y=floor(222/16/4)=3. Then, using the formula in block 1404, it may be determined that the generated addresses are: 204-207, 220-223, 236-239, and 252-255. These generated addresses correspond to or cover the entire tile in which the 222nd unit 1302 is contained.

Figure 15:
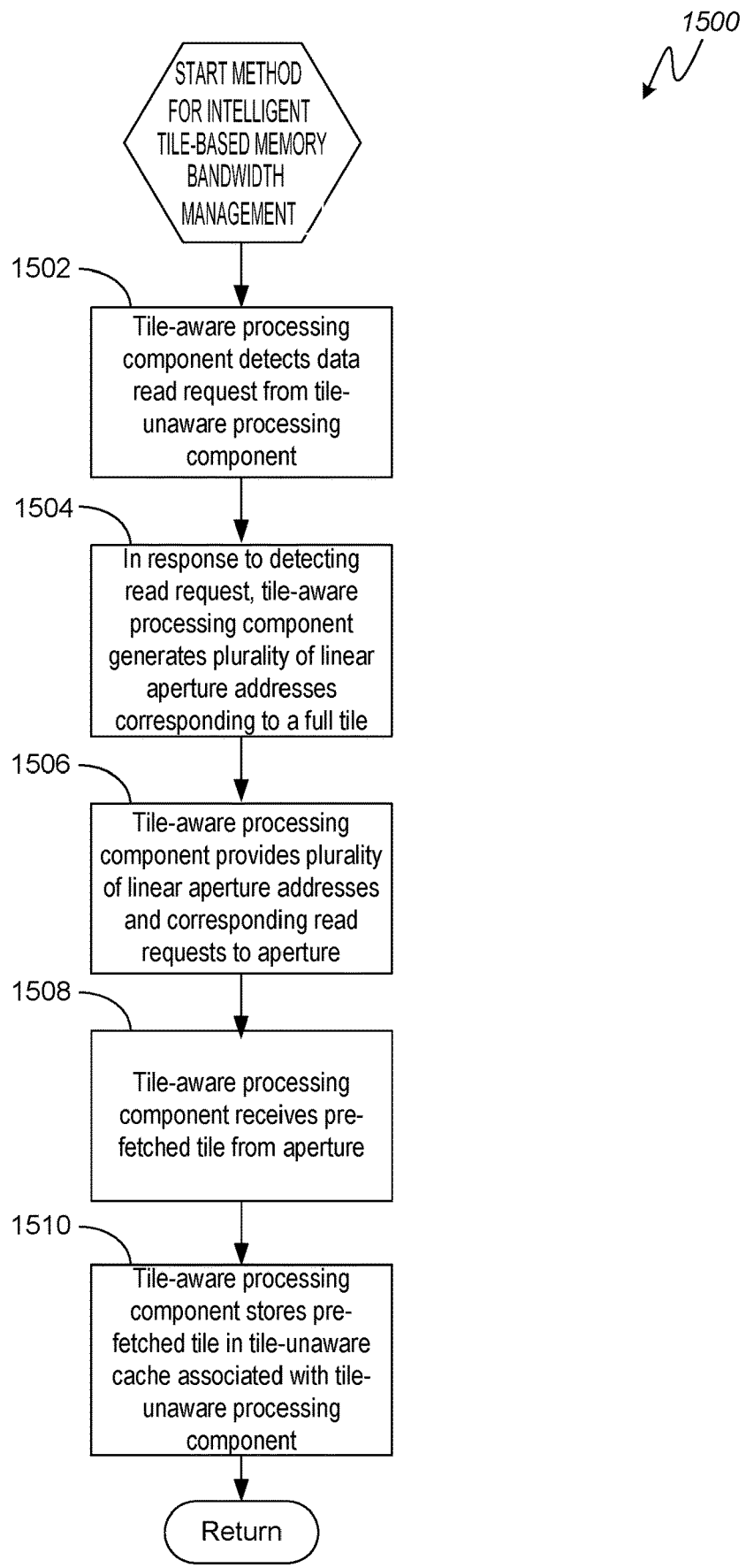
FIG. 15 is a logical flowchart illustrating a method for intelligent tile-based memory bandwidth management directed to providing a tile-aware data pre-fetch as part of servicing a linearly addressed data read request from a tile-unaware processing component, in accordance with exemplary embodiments.

FIG. 15 illustrates an exemplary method 1500 for intelligent tile-based memory bandwidth management directed to providing a tile-aware data pre-fetch as part of servicing a linearly addressed data read request from a tile-unaware processing component. As indicated by block 1502, the tile-aware processing component 1000 may detect a data read request from the associated tile-unaware process 112. As indicated by block 1504, in response to detecting the read request, the tile-aware processing component 1000 generates a plurality of linear addresses that correspond to a full or entire tile. The plurality of linear addresses include the address or addresses included in the original read request issued by the tile-unaware process 112 plus the additional generated addresses, so as to make up an entire tile. Block 1504 may be implemented in the manner described above with regard to FIG. 14. As indicated by block 1506, the plurality of linear addresses are provided to the address aperture 106 in association with the read request. The read request itself may be conveyed from the tile-unaware process 112 to the address aperture 106 in a conventional manner, while the addresses to be read in service of that read request are provided by the tile-aware processing component 1000 to the address aperture 106. The tile-unaware process 112 may be unaware that the address or addresses it provided as part of its original read request are being supplemented with additional addresses to be read. As both the tile-unaware process 112 and tile-aware processing component 1000 are associated with the same physical processor 104, all information associated with the read request may be conveyed by the same physical path from the processor 104 to the address aperture 106 as it would be conveyed in the case of a conventional read operation (i.e., in the absence of the tile-aware processing component 1000).

The address aperture 106 may use the plurality of linear addresses to pre-fetch an entire tile of data from the memory component 108. As indicated by block 1508, the pre-fetched tile of data may be received by the processor 104 from the address aperture 106. As indicated by block 1510, the tile-aware processing component 1000 may control storage of the pre-fetched tile of data in the cache 114 associated with the processor 104. In this manner, the tile-aware processing component 1000 may serve as a pre-fetcher, and thus enable the tile-unaware process 112 to benefit from a tile-aware data pre-fetch.

Figure 16:
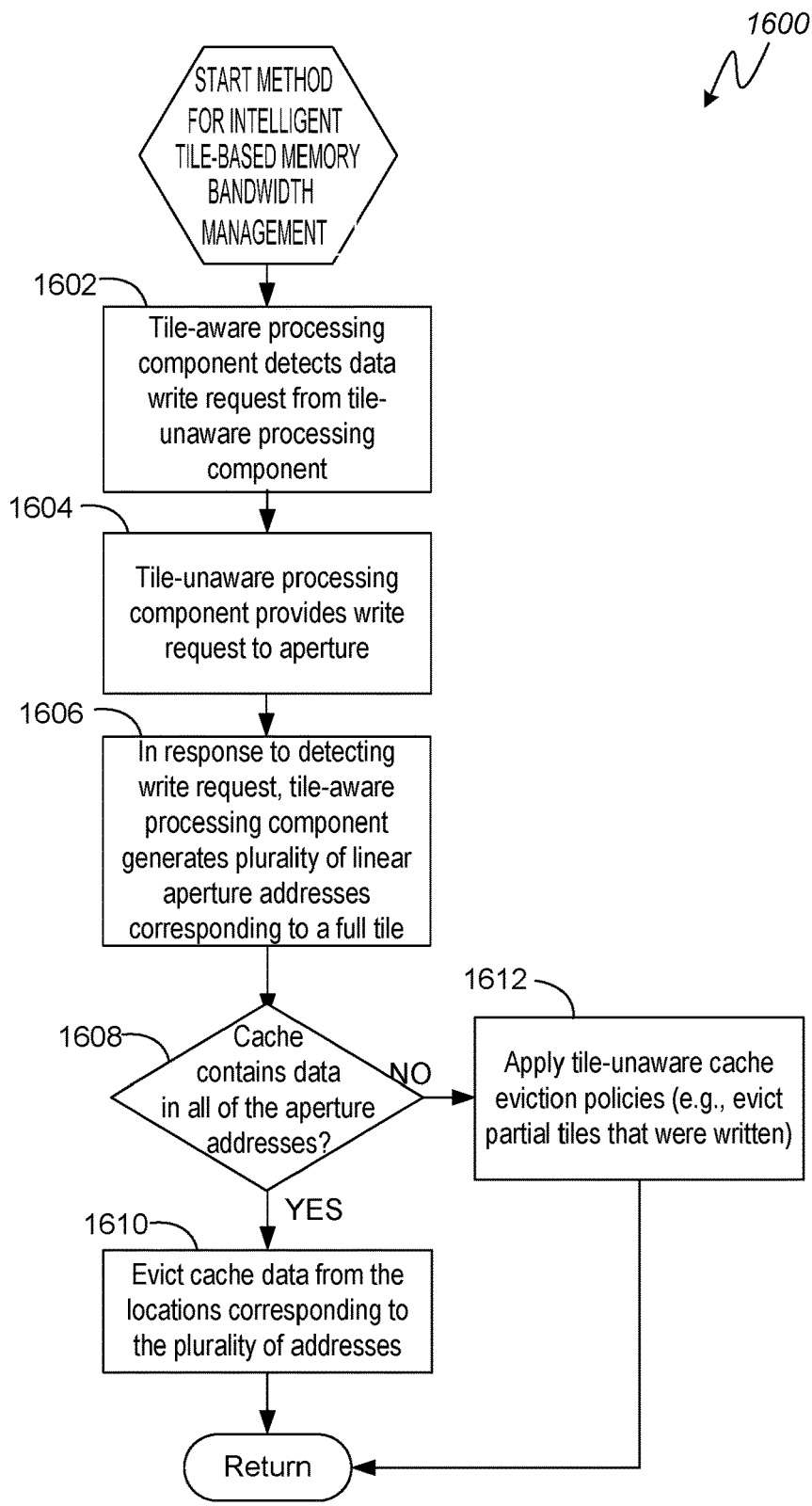
FIG. 16 is a logical flowchart illustrating a method for intelligent tile-based memory bandwidth management directed to providing tile-aware cache eviction in association with a linearly addressed data write request, in accordance with exemplary embodiments.

FIG. 16 illustrates an exemplary method 1600 for intelligent tile-based memory bandwidth management directed to providing tile-aware cache eviction in association with a linearly addressed data write request. As indicated by block 1602, the tile-aware processing component 1000 may detect a data write request from the associated tile-unaware process 112.

As indicated by block 1604, the original write request as issued by the tile-unaware processor 112 may be provided to the address aperture 106. As indicated by block 1606, in response to detecting the write request, the tile-aware processing component 1000 generates a plurality of linear addresses that correspond to a full or entire tile. Block 1606 may be implemented in the manner described above with regard to FIG. 14. The plurality of linear addresses include the address or addresses included in the original write request issued by the tile-unaware process 112 plus the additional generated addresses, so as to make up an entire tile. Nevertheless, in the method 1600 the generated plurality of linear addresses are not provided to the address aperture 106. Rather, the generated plurality of linear addresses are used to provide tile-aware eviction.

As indicated by block 1608, the tile-aware processing component 1000 may determine whether the cache 114 associated with the processor 104 contains data in all of the locations corresponding to the generated plurality of linear addresses. If the tile-aware processing component 1000 determines that the cache 114 contains data in all of the locations corresponding to the generated plurality of linear addresses, the tile-aware processing component 10(X) may cause data to be evicted from those locations in the cache 114, as indicated by block 1610. The eviction may be controlled by the tile-aware processing component 1000 itself or by the tile-aware processing component 1000 in conjunction with conventional eviction logic. In this manner, the tile-aware processing component 1000 may supplement otherwise conventional eviction logic with a tile-aware eviction policy, and thus enable the tile-unaware process 112 to benefit from tile-aware eviction. If the tile-aware processing component 1000 determines (block 1608) that the cache 114 does not contain data in all of the locations corresponding to the generated plurality of linear addresses, the tile-aware processing component 1000 may have no tile-aware effect upon eviction policies, i.e., conventional (tile-unaware) eviction policies may be applied, as indicated by block 1612.

Figure 17:
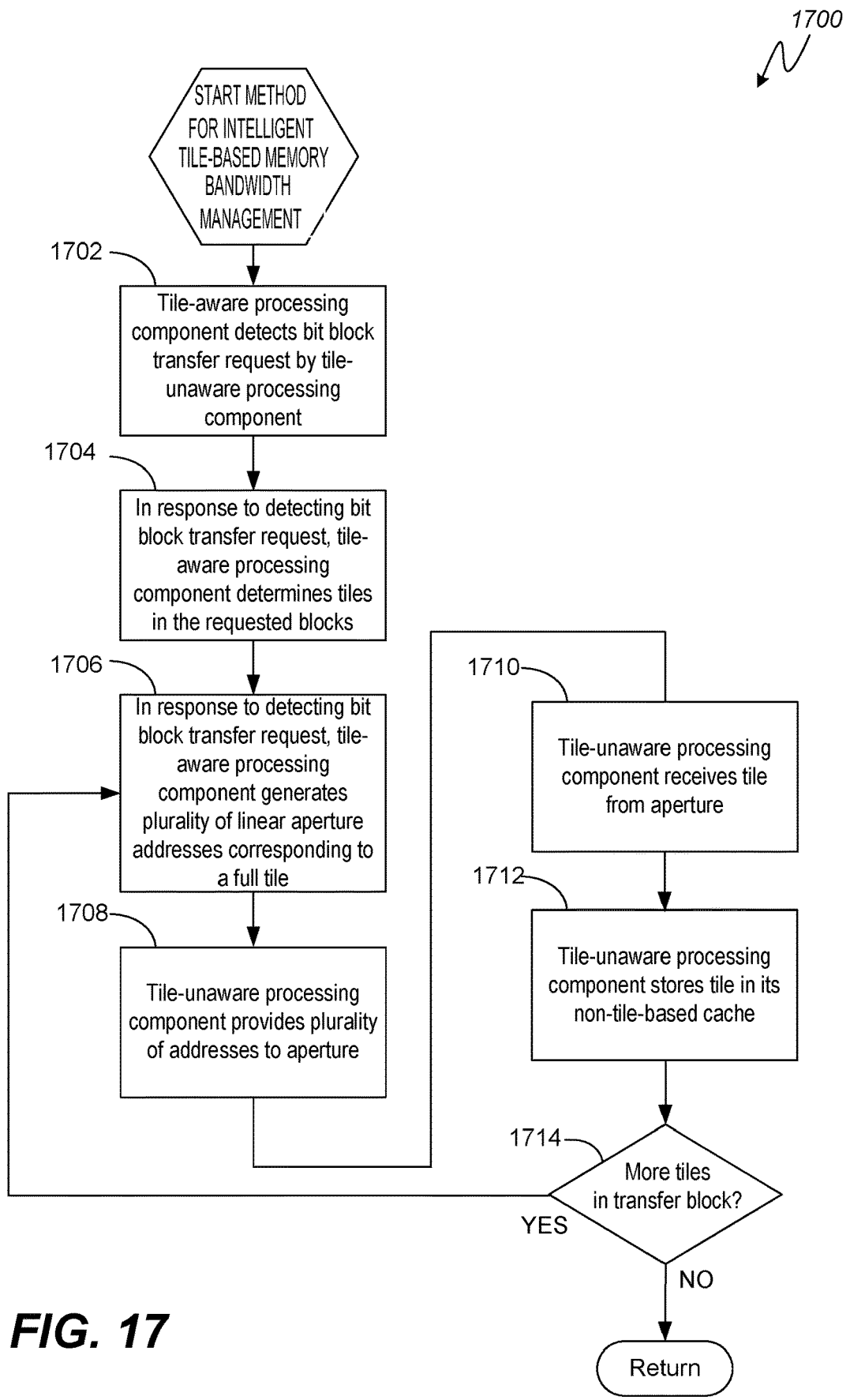
FIG. 17 is a logical flowchart illustrating a method for intelligent tile-based memory bandwidth management directed to providing a tile-aware bit block transfer, in accordance with exemplary embodiments.

FIG. 17 illustrates an exemplary method 1700 for intelligent tile-based memory bandwidth management directed to providing a tile-aware bit block transfer ("BLT"). As understood by one or ordinary skill in the art, a hit block transfer is a request to read a block of data from a source and write that block of data to a destination. The bit block transfer request therefore includes information identifying the source, the destination and the boundaries of the block. In the context of the present embodiments, a bit block transfer may, for example, identify a block of linear aperture addresses to be read from the memory component 108 and transferred or written to the cache 114 associated with the processor 104 or other destination. The block of linear aperture addresses may correspond in the tile-based address space to a region within a tile or a region spanning two or more tiles.

As indicated by block 1702, the tile-aware processing component 1000 may detect a bit block transfer request from the associated tile-unaware process 112. As indicated by block 1704, the tile-aware processing component 1000 determines which one or more tiles include the bit blocks identified in bit block transfer request. As indicated by block 1706, in response to detecting the bit block transfer request, the tile-aware processing component 1000 generates a plurality of linear addresses that correspond to those one or more tiles in their entireties. The plurality of linear addresses include the address or addresses included in the bit block transfer request issued by the tile-unaware process 112 plus the additional generated addresses, so as to make up an entire tile (or more than one tile, if the bit block transfer overlaps or spans multiple tiles). Block 1706 may be implemented in the manner described above with regard to FIG. 14.

As indicated by block 1708, the plurality of linear addresses may be provided to the address aperture 106 in association with the bit block transfer request. The bit block transfer request itself may be conveyed from the tile-unaware process 112 to the address aperture 106 in a conventional manner, while the addresses to be read in service of that read request are provided by the tile-aware processing component 1000 to the address aperture 106. The tile-unaware process 112 may be unaware that the address or addresses it provided as part of its original bit block transfer request are being supplemented with additional addresses to be read and transferred. As both the tile-unaware process 112 and tile-aware processing component 1000 are associated with the same physical processor 104, all information associated with the read request may be conveyed by the same physical path from the processor 104 to the address aperture 106 as it would be conveyed in the case of a conventional bit block transfer operation (i.e., in the absence of the tile-aware processing component 1000).

The address aperture 106 may use the plurality of linear addresses to read one or more entire tiles of data from the memory component 108. As indicated by block 1710, the one or more tiles of data may be received by the processor 104 from the address aperture 106. As indicated by block 1712, the tile-aware processing component 1000 may control storage of the one or more tiles of data in the cache 114 associated with the processor 104. Blocks 1706-1712 may repeat until there are no more tiles to be transferred, as indicated by block 1714. In this manner, the tile-aware processing component 1000 may serve as a tile-aware bit block transfer controller, and thus enable the tile-unaware process 112 to benefit from a tile-aware bit block transfer.

It should be understood that although certain steps of the methods described above may naturally precede others for the methods to function as described, the scope of the invention is not limited to a particular order of steps if such order does not alter the functionality of the method. That is, it is recognized that some steps may be performed before, after, or substantially concurrently with other steps without departing from the scope of the invention. In some instances, certain steps may be omitted or not performed without departing from the scope of the invention. Further, words such as "thereafter," "then," "next," etc., are not intended to limit the order of the steps. Rather, these words are used to guide the reader through the description of the exemplary method.

Methods described in this disclosure may be implemented in hardware, software, firmware, or any combination thereof. In embodiments in which methods or portions thereof are implemented in software, corresponding computer-executable instructions or code may be stored on a non-transitory, computer-readable medium, such as, for example, a memory, disk, etc.

Figure 18:
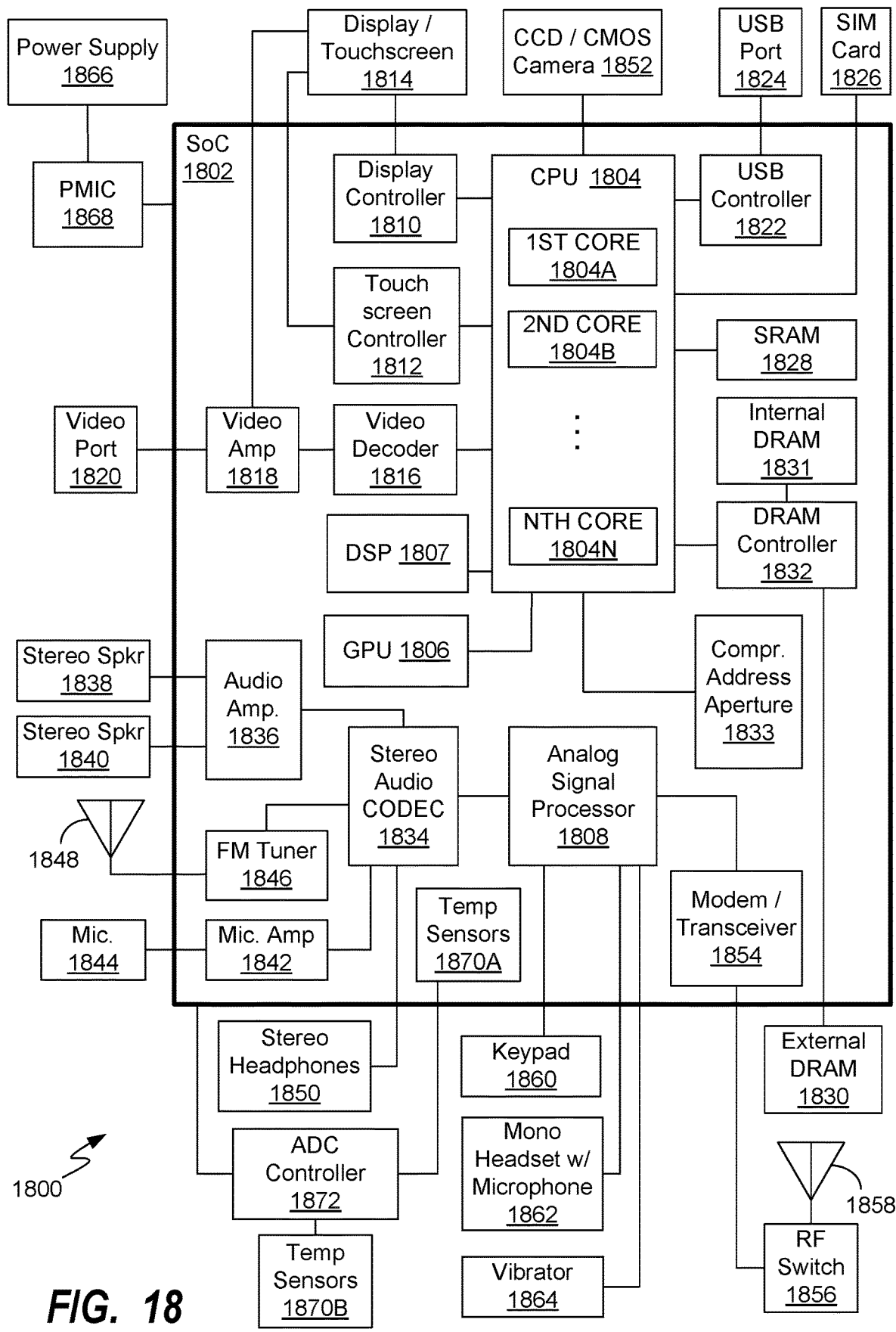
FIG. 18 is a functional block diagram illustrating a portable computing device in the form of a wireless telephone, in accordance with exemplary embodiments.

As illustrated in FIG. 18, exemplary systems and methods for intelligent tile-based memory bandwidth management may be embodied in a PCD 1800. The PCD 1800 may be an example of the above-described PCD 100 of FIGS. 3 and 10. The PCD 1800 includes an SoC 1802, which may be an example of the above-described SoC 102 of FIGS. 3 and 10. The SoC 1802 may include a CPU 1804, a GPU 1806, a DSP 1807, an analog signal processor 1808, or other processors. The CPU 1804 may include multiple cores, such as a first core 1804A, a second core 1804B, etc., through an Nth core 1804N. Any such processors may be tile-unaware or include tile-unaware processes in execution. Alternatively, or in addition, any such processors may be tile-aware or include tile-aware processes in execution. For example, any such processor may be an example of the above-described processor 104 or 126 (FIGS. 3 and 10).

A display controller 1810 and a touchscreen controller 1812 may be coupled to the CPU 1804. A touchscreen display 1814 external to the SoC 1802 may be coupled to the display controller 1810 and the touchscreen controller 1812. The PCD 1800 may further include a video decoder 1816 coupled to the CPU 1804. A video amplifier 1818 may be coupled to the video decoder 1816 and the touchscreen display 1814. A video port 1820 may be coupled to the video amplifier 1818. A universal serial bus ("USB") controller 1822 may also be coupled to CPU 1804, and a USB port 1824 may be coupled to the USB controller 1822. A subscriber identity module ("SIM") card 1826 may also be coupled to the CPU 1804.

One or more memories may be coupled to the CPU 1804. The one or more memories may include both volatile and non-volatile memories. Examples of volatile memories include static random access memory ("SRAM") 1828 and dynamic RAMs ("DRAM"s) 1830 and 1831. Such memories may be external to the SoC 1802, such as the DRAM 1830, or internal to the SoC 1802, such as the DRAM 1831. A DRAM controller 1832 coupled to the CPU 1804 may control the writing of data to, and reading of data from, the DRAMs 1830 and 1831. In other embodiments, such a DRAM controller may be included within a processor, such as the CPU 1804. The one or more memories, such as DRAM 1830 or 1831, may be examples of the above-described memory component 108 (FIGS. 3 and 10).

The SoC 1802 may include a compression address aperture 1833, which may be an example of the above-described compression address aperture 106 (FIGS. 3 and 10). The compression address aperture 106 may operate in a manner similar to a processor. That is, the compression address aperture 106 may include hardware that is configurable by the execution of software or firmware. For purposes of example, the compression address aperture 1833 may be coupled to the CPU 1804 as shown in FIG. 18. Nevertheless, it should be understood that the compression address aperture 1833 and, more generally, various other components shown in FIG. 18, may be interconnected or coupled with each other via one or more signal interconnects such as busses, which are not shown in FIG. 18 for purposes of clarity.

A stereo audio CODEC 1834 may be coupled to the analog signal processor 1808. Further, an audio amplifier 1836 may be coupled to the stereo audio CODEC 1834. First and second stereo speakers 1838 and 1840, respectively, may be coupled to the audio amplifier 1836. In addition, a microphone amplifier 1842 may be coupled to the stereo audio CODEC 1834, and a microphone 1844 may be coupled to the microphone amplifier 1842. A frequency modulation ("FM") radio tuner 1846 may be coupled to the stereo audio CODEC 1834. An FM antenna 1848 may be coupled to the FM radio tuner 1846. Further, stereo headphones 1850 may be coupled to the stereo audio CODEC 1834. Other devices that may be coupled to the CPU 1804 include a digital (e.g., CCD or CMOS) camera 1852.

A modem or radio frequency ("RF") transceiver 1854 may be coupled to the analog signal processor 1808. An RF switch 1856 may be coupled to the RF transceiver 1854 and an RE antenna 1858. In addition, a keypad 1860, a mono headset with a microphone 1862, and a vibrator device 1864 may be coupled to the analog signal processor 1808.

A power supply 1866 may be coupled to the SoC 1802 via a power management integrated circuit ("PMIC") 1868. The power supply 1866 may include a rechargeable battery or a DC power supply that is derived from an AC-to-DC transformer connected to an AC power source.

The SoC 1802 may have one or more internal or on-chip thermal sensors 1870A and may be coupled to one or more external or off-chip thermal sensors 1870B. An analog-to-digital converter ("ADC") controller 1872 may convert voltage drops produced by the thermal sensors 1870A and 1870B to digital signals.

The touch screen display 1814. the video port 1820, the USB port 1824, the camera 1852, the first stereo speaker 1838, the second stereo speaker 1840, the microphone 1844, the FM antenna 1848, the stereo headphones 1850, the RF switch 1856, the RF antenna 1858, the keypad 1860, the mono headset 1862, the vibrator 1864, the thermal sensors 1850B, the ADC controller 1852, the PMIC 1868, the power supply 1866, the DRAM 1830, and the SIM card 1826 are external to the SoC 1802 in this exemplary embodiment. It will be understood, however, that in other embodiments one or more of these devices may be included in such an SoC.

Therefore, although selected aspects have been illustrated and described in detail, it will be understood that various substitutions and alterations may be made therein without departing from the spirit and scope of the present invention, as defined by the following claims.

What is claimed is:

1. A method for intelligent tile-based memory bandwidth management in a portable computing device ("PCD"), the method comprising:

receiving at an address aperture a data read request from a processing component for data stored in a memory component having a tile-based address structure, wherein the data read request is associated with a linear aperture address;

in response to receiving the data read request, the address aperture determining a tile-based address in an alias address region of the memory component, wherein the tile-based address is associated with one or more tiles containing data needed for servicing the data read request;

the address aperture determining whether the one or more tiles are available in a tile-based cache of the address aperture;

in response to determining that the one or more tiles are not available in the tile-based cache of the address aperture, the address aperture reading the one or more tiles from the memory component and returning to the processing component data from the one or more tiles read from the memory component;

the address aperture determining whether the processing component is tile-unaware or tile-aware; and the address aperture managing free space in the tile-based cache of the address aperture based on whether the processing component is tile-unaware or tile-aware.

2. The method of claim 1, wherein managing free space in the tile-based cache of the address aperture comprises:

in response to determining that the processing component is tile-aware, the address aperture determining whether a tile-based function of the address aperture is completed before a plurality of data read requests corresponding to an entire tile have been received from the processing component; and in response to determining that the tile-based function of the address aperture is completed before the plurality of data read requests corresponding to the entire tile have been received from the processing component, the address aperture managing free space in the tile-based cache of the address aperture by refraining from allocating space in the tile-based cache for data read from the memory component in response to the data read request.

3. The method of claim 2, wherein managing free space in the tile-based cache of the address aperture further comprises:

in response to determining that the tile-based function of the address aperture is not completed before the plurality of data read requests corresponding to the entire tile have been received from the processing component, allocating space in the tile-based cache for the entire tile in response to the data read request; and in response to determining that the tile-based function of the address aperture is not completed before the plurality of data read requests corresponding to the entire tile have been received from the processing component, the address aperture managing free space in the tile-based cache of the address aperture by evicting the entire tile in the tile-based cache after the plurality of data read requests corresponding to the entire tile have been received from the processing component.

4. The method of claim 3, further comprising the address aperture determining that the plurality of data read requests corresponding to the entire tile have been received from the processing component using a data structure having a plurality of indicator bits, each corresponding to a portion of the entire tile, wherein each indicator bit is updated to indicate an access of a corresponding portion.

5. The method of claim 1, further comprising:

receiving at the address aperture a data write request from the processing component to store data in the memory component;

the address aperture determining whether servicing the data write request requires one or more partial tile writes;

in response to determining that servicing the data write request requires one or more partial tile writes, the address aperture storing data from the data write request in the tile-based cache; and in response to determining that the processing component is tile-aware, the address aperture managing free space in the tile-based cache of the address aperture by evicting an entire tile in the tile-based cache after a plurality of data write requests corresponding to the entire tile have been received from the processing component.

6. The method of claim 5, further comprising the address aperture determining that the plurality of data write requests corresponding to the entire tile have been received from the processing component using a data structure having a plurality of indicator bits, each corresponding to a portion of the entire tile, wherein each indicator bit is updated to indicate an access of a corresponding portion.

7. The method of claim 1, wherein determining whether the processing component is tile-unaware or tile-aware comprises determining a value of a tag bit on a memory bus.

8. The method of claim 1, wherein determining whether the processing component is tile-unaware or tile-aware comprises determining a value within metadata stored in the memory component in association with a tile.

9. The method of claim 1, wherein determining whether the processing component is tile-unaware or tile-aware comprises determining whether a time interval elapses before access of an entire tile is completed by the processing component.

10. A system for intelligent tile-based memory bandwidth management in a portable computing device ("PCD"), the system comprising:

an address aperture configured to:

receive at an address aperture a data read request from a processing component for data stored in a memory component having a tile-based address structure, wherein the data read request is associated with a linear aperture address;

in response to receiving the data read request, determine a tile-based address in an alias address region of the memory component, wherein the tile-based address is associated with one or more tiles containing data needed for servicing the data read request;

determine whether the one or more tiles are available in a tile-based cache of the address aperture;

in response to determining that the one or more tiles are not available in the tile-based cache of the address aperture, read the one or more tiles from the memory component and returning to the processing component data from the one or more tiles read from the memory component;

determine whether the processing component is tile-unaware or tile-aware; and manage free space in the tile-based cache of the address aperture based on whether the processing component is tile-unaware or tile-aware.

11. The system of claim 10, wherein the address aperture is configured to manage free space in the tile-based cache by being configured to:

in response to determining that the processing component is tile-aware, determine whether a tile-based function of the address aperture is completed before a plurality of data read requests corresponding to an entire tile have been received from the processing component; and in response to determining that the tile-based function of the address aperture is completed before the plurality of data read requests corresponding to the entire tile have been received from the processing component, refrain from allocating space in the tile-based cache for data read from the memory component in response to the data read request.

12. The system of claim 11, wherein the address aperture is configured to manage free space by being configured to:

in response to determining that the tile-based function of the address aperture is not completed before the plurality of data read requests corresponding to the entire tile have been received from the processing component, allocate space in the tile-based cache for the entire tile in response to the data read request; and in response to determining that the tile-based function of the address aperture is not completed before the plurality of data read requests corresponding to the entire tile have been received from the processing component, evict the entire tile in the tile-based cache after the plurality of data read requests corresponding to the entire tile have been received from the processing component.

13. The system of claim 12, wherein the address aperture is further configured to determine whether the plurality of data read requests corresponding to the entire tile have been received from the processing component using a data structure having a plurality of indicator bits, each corresponding to a portion of the entire tile, wherein each indicator bit is updated to indicate an access of a corresponding portion.

14. The system of claim 10, wherein the address aperture is further configured to:
- receive a data write request from the processing component to store data in the memory component;
- determine whether servicing the data write request requires one or more partial tile writes:
- in response to determining that servicing the data write request requires one or more partial tile writes, store data from the data write request in the tile-based cache; and
- in response to determining that the processing component is tile-aware, evict an entire tile in the tile-based cache after a plurality of data write requests corresponding to the entire tile have been received from the processing component.

15. The system of claim 14, wherein the address aperture is further configured to determine whether the plurality of data write requests corresponding to the entire tile have been received from the processing component using a data structure having a plurality of indicator bits, each corresponding to a portion of the entire tile, wherein each indicator hit is updated to indicate an access of a corresponding portion.

* * * * *